United States Patent
Honda et al.

(10) Patent No.: US 6,538,697 B1
(45) Date of Patent: *Mar. 25, 2003

(54) MAN-MACHINE INTERFACE APPARATUS AND METHOD

(75) Inventors: Hirofumi Honda, Machida (JP); Yoshiyuki Watanabe, Kokubunji (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/644,633

(22) Filed: Apr. 25, 1996

(30) Foreign Application Priority Data

Apr. 26, 1995 (JP) .............................................. 7-102129
Jun. 27, 1995 (JP) .............................................. 7-160928

(51) Int. Cl.$^7$ ............................................. H04N 5/222
(52) U.S. Cl. ............................. 348/333.03; 348/333.05; 348/333.09; 396/51
(58) Field of Search ............................. 348/61, 62, 78, 348/207, 211, 212, 213, 222, 333, 334, 373, 375, 376, 333.01–333.05, 333.09, 333.11; 351/209, 210; 396/51; 340/825.19; 341/21, 31; 345/156; H04N 7/18, 9/47, 5/222

(56) References Cited

U.S. PATENT DOCUMENTS

| | | | | |
|---|---|---|---|---|
| 4,109,145 A | * | 8/1978 | Graf ............................. | 250/221 |
| 4,836,670 A | * | 6/1989 | Hutchinson ................... | 351/210 |
| 4,946,271 A | * | 8/1990 | Palsgard et al. ............... | 351/210 |
| 5,245,381 A | * | 9/1993 | Takagi ........................... | 396/287 |
| 5,253,008 A | * | 10/1993 | Konishi et al. ................. | 396/51 |
| 5,333,029 A | * | 7/1994 | Uchiyama et al. ............. | 396/51 |
| 5,335,035 A | * | 8/1994 | Maeda .......................... | 396/51 |
| 5,546,158 A | * | 8/1996 | Konishi ........................ | 396/51 |
| 5,579,048 A | * | 11/1996 | Hirasawa ................ | 348/333.03 |
| 5,689,619 A | * | 11/1997 | Smyth .......................... | 395/10 |
| 5,790,099 A | * | 8/1998 | Okada .......................... | 345/157 |
| 5,819,119 A | * | 10/1998 | Imafuji et al. ................. | 396/51 |

OTHER PUBLICATIONS

P. 7 of DAMARK Catalog—Eye—control Camcorder from Canon ES6000.*

* cited by examiner

*Primary Examiner*—Ngoc-Yen Vu
(74) *Attorney, Agent, or Firm*—Morgan & Finnegan, LLP

(57) ABSTRACT

There is disclosed a VTR apparatus which can display a menu item for selecting a page and other VTR function menu items on the four corner portions in a viewfinder. These menu items have eye switch functions. When the page selection menu item is selected in the eye switch mode, a plurality of VTR function menu items are displayed on the four corner portions of the viewfinder as eye switches, and the names of these VTR functions are displayed as a list on the central field of the viewfinder.

25 Claims, 15 Drawing Sheets

MAN-MACHINE INTERFACE APPARATUS AND METHOD

BACKGROUND OF THE INVENTION

The present invention relates to a man-machine interface apparatus and a man-machine interface method and, more particularly, to a man-machine interface apparatus and a man-machine interface method using an eye switch menu search method suitable for searching a menu item to be found by an eye switch.

For example, in the electronic viewfinder (EVF) of a camera built-in type VTR, a switch selection method based on the detection of line of sight (to be referred to as an "eye switch" hereinafter) has been proposed. In this selection method, the line of sight position (gazing position) of an operator in the viewfinder is detected, and when it is detected that the detected line of sight position matches a menu item displayed on an image display unit, a switch selection operation corresponding to the matched menu item is executed.

FIG. 1 shows the transition states of finder page screens upon switch selection on a conventional viewfinder. In FIG. 1, page screens 8-a to 8-d represent the respective states of a display unit that realizes the above-mentioned eye switches. A conventional eye switch of this type will be described in detail below with reference to FIG. 1.

Referring to FIG. 1, the page screen 8-a shows a state wherein a normal image is displayed, and three menu items (to be referred to as "ITEM1" to "ITEM3" hereinafter for the sake of simplicity) which can be selected by the eye switches are displayed on fields 101 to 103. When a large number of menu items are available, these menu items are displayed across several pages, and for this purpose, an item for selecting the next page (to be referred to as a "NEXT PAGE" item hereinafter) is prepared on a field 104. Since the display fields of the menu items and the display field of the "NEXT PAGE" item are located on the four corner portions of the display unit, in other words, since a blank field is assured at the central portion of the display unit, a sufficient field of view is assured for the operator.

Assume that the page screen 8-a does not display any menu items that the operator desired. In this case, in order to search for a desired menu item, i.e., to explore other pages, the operator gazes at the "NEXT PAGE" field 104. When it is detected that the line of sight position matches the "NEXT PAGE" field 104, the "NEXT PAGE" field 104 in FIG. 1 changes to a highlighted field 105 (see the page screen 8-b). With this change, the operator can recognize that an eye switch associated with the next page selection operation has been executed.

When, the next page selection operation has been executed, the displayed menu items change from "ITEM1" to "ITEM3" on the fields 101 to 103 to "ITEM4" to "ITEM6" on fields 106 to 108, as indicated by the page screen 8-c.

Furthermore, when the operator keeps gazing at the field 104 (i.e., the field 105), the page screens 8-b to 8-d are repetitively displayed on the display unit. In this case, the eye switch associated with the next page selection operation is executed only when the operator gazes at the field 104 for a predetermined period of time or more, so as to prevent an operation error of the switch.

FIG. 2 shows the transition states of viewfinder page screens when "ITEM4" (field 107) is executed by the eye switch as the page screen 8-c is displayed. Note that a series of operations for switching a page screen 9-a to a page screen 9-c until menu item 4 is displayed on the display unit are the same as those for the page screens 8-a to 8-c shown in FIG. 1.

When "ITEM4" as a target menu is displayed on the field 107 on the page screen 9-c, the operator gazes at the field 107. When the line of sight position matches the field 107, the field 107 is highlighted (see a field 115 on a page screen 9-d), and the operator can recognize that an eye switch associated with "ITEM4" is being executed.

Upon completion of execution of the eye switch associated with "ITEM4", when the operator moves his or her line of sight position from the field 115, the display state of the display unit is restored to a normal image display state, as indicated by a page screen 9-e.

Note that an eye switch associated with each menu item is executed only when the operator gazes at the corresponding field (107 in this case) for a predetermined period of time or more, so as to prevent an operation error of the switch, as described above.

FIGS. 3 and 4 show other examples of the transition states of page screens based on the conventional eye switch.

Referring to FIG. 3, a page screen 3-a corresponds to a normal image display state, and fields 301 to 303 in the displayed page screen 3-a display operation items that can be selected and executed by the line of sight. In the example shown in FIG. 3, the operation items include "WIDE", "TELESCOPIC", and "DATE". Also, images of a circular cylinder, rectangular parallelopiped, sphere, and triangular cone are displayed on the screen. As in the examples shown in FIGS. 1 and 2, since a large number of items to be operated by eye switches are available in FIGS. 3 and 4, these items must be displayed across several pages. For this purpose, a display field 304 for a "NEXT PAGE" item is prepared. Since these operation items and the "NEXT PAGE" display field 304 are located on the four corner portions of the display screen, a sufficient field of view of an EVF image can be assured.

Assume that the displayed page screen 3-a does not display any operation items that the operator desired. In this case, in order to search for a target operation item, the operator gazes at the field 304 for displaying the "NEXT PAGE" item. Then, the field 304 is emphasis-displayed, as indicated by a field 305 (page screen 3-b), and the operator can recognize that an eye switch associated with the next page selection operation is being executed. At the same time, the next page selection function is executed by the eye switch, and the operation items to be displayed change from "WIDE", "TELESCOPE", and "DATE" on the fields 301 to 303 to "FADE", "DIGITAL", and "BLC" on fields 307 to 309, as indicated by a third page screen 3-c.

When the operator keeps his or her eye on the "NEXT PAGE" display field 305, the next page selection operation is repetitively executed, and the display unit displays the second page screen 3-b to a fourth page screen 3-d in turn. Note that the eye switch associated with the next page selection operation is executed when the line of sight position stays on the "NEXT PAGE" display field 304 for 1.5 sec or more, so as to avoid an operation error of the switch.

A procedure when an operator executes a digital effect operation by an eye switch will be explained below with reference to FIG. 3. In this case, since the first page screen 3-a as an initial page screen does not display any items for executing this operation, the operator gazes at the "NEXT PAGE" item field 304 (page screen 3-*b*) to switch the page screen to the third page screen 3-*c* on which the "DIGITAL" item is displayed. When the operator then gazes at the "DIGITAL" item display field 308, the digital effect operation is executed. In the example shown in FIG. 3, the type of digital effect is set to be "MOSAIC" in advance, and upon execution of the above-mentioned operation procedure, a mosaic image is displayed on the display screen, as indicated by a fifth page screen 3-*e*.

Another display control of an eye switch in the viewfinder shown in FIG. 3 will be described below with reference to FIG. 4.

Referring to FIG. 4, a first page screen 4-*a* corresponds to a normal display state of an electronic viewfinder EVF. In this state, when the operator depresses an eye-controlled menu key 401, the display state of the viewfinder EVF is switched, as indicated by a second page screen 4-*b*, and the mode of the VTR is switched to an eye-controlled menu mode.

After the eye-controlled menu mode is selected, "MENU1" and "MENU2" are respectively displayed on the left and right end fields 402 and 403 on the upper portion of the screen of the viewfinder EVF. In this state, when the operator gazes at the "MENU1" field 402, the display state in the viewfinder EVF is switched, as indicated by a third page screen 4-*c*.

The third page screen 4-*c* displays setting items "WINDOW CUT" (field 404), "WHITE BALANCE" (field 405), "REMOTE CONTROL SENSOR" (field 406), and "SHUTTER" (field 407) as a setting item group of "MENU1", and their corresponding setting states (e.g., "WINDOW CUT" is set in the "ON" state). In this display state, the operator gazes at an item, the setting state of which is to be changed. For example, when the operator gazes at the "REMOTE CONTROL SENSOR" field 406, the display state in the viewfinder EVF is switched, as indicated by a fourth page screen 4-*d*. The fourth page screen 4-*d* allows the operator to change the setting state of "REMOTE CONTROL SENSOR". In this state, when the operator gazes at an "OFF" display field 409 and then turns his or her eye to an "<OK>" display field 410, the setting state of "REMOTE CONTROL SENSOR" changes to the "OFF" state, and this VTR does not accept any remote-control operation thereafter. At the same time, the display state in the viewfinder EVF is switched to the state of a fifth page screen 4-*e*, i.e., the viewfinder displays that "REMOTE CONTROL SENSOR" is set in the "OFF" state. Therefore, the operator can easily confirm the setting state of "REMOTE CONTROL SENSOR".

On the other hand, as indicated by a sixth page screen 4-*f*, "MENU2" includes items "TIME ZONE" (field 412), "TALLY" (field 413), "SUMMERTIME" (field 414), and "EYE SWITCH" (field 415). In order to change the setting states of these items (fields 412 to 415), the operator gazes at the "MENU2" item field 403 on the second page screen 4-*b*, the third page screen 4-*c*, the fifth page screen 4-*e*, or the like, which displays the "MENU2" item field 403. With this operation, the display state in the viewfinder EVF can be switched to that of a sixth page screen 4-*f*. In this state, when the operator gazes at the display field of an item, the setting state of which is to be changed, e.g., "TIME ZONE" display field 412, the display state in the viewfinder EVF is switched to that of a seventh page screen 4-*g*, and the time zone to be displayed of the world clock can be selected.

For example, when the operator gazes at a "SYDNEY" field 417 and then turns his or her eyes to the "<OK>" field 410, "TIME ZONE" changes to "SYDNEY". At the same time, the page screen is switched to an eighth page screen 4-*h*, and the operator can confirm that "TIME ZONE" has changed to "SYDNEY".

Upon execution of a series of operations described above, the function setting state of the VTR can be changed using an eye-controlled menu. Note that the setting item-setting command is executed after the operator gazes at a single display item for 1 sec or more, so as to avoid an operation error.

The problems in the two prior arts described in association with FIGS. 1 and 2 and FIGS. 3 and 4 will be explained below.

In the prior art shown in FIGS. 1 and 2, the menu item fields 101 to 103 and the menu item field 104 to be operated by the eye switches are displayed on the four corner portions so as to assure a sufficient field of view of an original image on the page screen 8-*a*. For this reason, when the operator gazes at the "NEXT PAGE" display field 104 on the lower right corner to execute the next page selection function, other menu items to be displayed change upon execution of the next page selection function although the display state of "NEXT PAGE" remains the same. For this reason, when the operator searches for his or her desired item, he or she must gaze in turn at the four corner portions of the display unit, resulting in poor operability.

Furthermore, since the menu items are located on the four corner portions of the display unit and the operator cannot smoothly gaze at each one of these items in turn, the gazing period for confirmation tends to become longer than that required, and the operator may inadvertently operate an unwanted eye switch, resulting in an operation error.

In the prior art associated with the eye-controlled menu (FIGS. 3 and 4), immediately after the third or sixth page screen 4-*c* or 4-*f* is selected by gazing at the "MENU1" or "MENU2" display field 402 or 403, when the operator turns his or her eye to other setting items to confirm the setting states of a plurality of displayed items, and gazes at one of these items for a period longer than that required, the display state may be switched to the selection state (e.g., the fourth page screen 4-*d*, the seventh page screen 4-*g*, or the like) of a wrong item, resulting in an operation error.

Furthermore, the "<OK>" display field 410 and the "MENU2" display field 403 are located at an identical position in FIG. 4. For this reason, after the operator determines the setting state of an arbitrary item by gazing at the "<OK>" display field 410, if the line of sight position stays in this position after the display state resumes to that of the fifth page screen 4-*e*, the eighth page screen 4-*h*, or the like, the operator undesirably gazes at the "MENU2" display field 403.

SUMMARY OF THE INVENTION

The present invention has been made to solve the above-mentioned problems, and has as its object to provide a man-machine interface apparatus and method which can improve operability by displaying menu items in different display formats.

In order to achieve the above object, according to the present invention, there is provided a man-machine interface apparatus having display means that simultaneously displays a plurality of menu items in a first display format, comprising:

display switching means for switching a display format of the plurality of menu items from the first display format to a second display format different from the first display format; and restoring means for, when the display format is switched by the display switching means from the first display format to the second display format, displaying the plurality of menu items in the second display format for a predetermined period and thereafter restoring the display format to the first display format.

Also, in order to achieve the above object, according to the present invention, there is provided a man-machine interface method for displaying a plurality of menu items in a first display format, comprising the steps of:

switching a display format of the plurality of menu items from the first display format to a second display format different from the first display format in response to an operation with respect to a predetermined selection menu; and displaying the plurality of menu items in the second display format for a predetermined period, and thereafter, restoring the display format to the first display format when the first display format is switched to the second display format.

According to the apparatus and method with the above arrangement, since identical menu items are displayed in different display formats, the operability can be improved.

According to one preferred aspect of the present invention, each of the plurality of menu items is displayed at a predetermined first position in the first display format, and is displayed at a predetermined second position different from the first position in the second display format. According to this aspect, when the second position is set at, e.g., the center of the screen, the visibility of the operator can be improved.

According to one preferred aspect of the present invention, each of the plurality of menu items is displayed at a predetermined first position in the first display format, and is displayed at the first position and also at a predetermined second position different from the first position in the second display format. According to this aspect, since the menu items are displayed at both the two positions, i.e., the first and second positions, the visibility of the operator can be further improved.

According to one preferred aspect of the present invention, each of the plurality of menu items is assigned with an eye switch function. More specifically, when each menu item serves as an eye switch, the eye switch menu item is displayed in the second display format, thus greatly improving the visibility and operability.

According to one preferred aspect of the present invention, the plurality of menu items are displayed on the display means while being divided into a plurality of pages, each of the pages has a menu item group, and the display switching means comprises:

means for displaying a page selection menu for selecting a page on the display means;

means for detecting if the page selection menu is selected by an operator; and means for, when the operator does not select the page selection menu, displaying an arbitrary menu item group in the first display format, and for, when the operator selects the page selection menu, displaying a menu item group designated by the menu selection menu in the second. display format.

According to one preferred aspect of the present invention, in the second display format, the plurality of menu items are displayed on a field near a center of the display means.

According to one preferred aspect of the present invention, in the second display format, a state or associated information of each of the plurality of menu items is displayed.

Furthermore, in order to achieve the above object, according to the present invention, there is provided a man-machine interface apparatus having display means that simultaneously displays a plurality of menu items in a first display format, comprising:

menu means for displaying a selection menu for instructing switching of a display format of the plurality of menu items from the first display format to a second display format different from the first display format on a display screen of the display means;

detection means for detecting if the selection menu is operated; and display switching means for switching the display format of the plurality of menu items from the first display format to the second display format upon reception of an output from the detection means.

According to one preferred aspect of the present invention, the detection means comprises means for detecting that the selection menu is operated for a first period.

According to one preferred aspect of the present invention, the apparatus further comprises means for detecting that an arbitrary one of the plurality of menu items is operated for a second period, and the first period is set to be longer than the second period. Since the second display format has a long display period, the menu items displayed in the second display format can be confirmed using a longer period of time.

According to one preferred aspect of the present invention, the apparatus further comprises restoring means for, when the display format is switched by the display switching means from the first display format to the second display format, displaying the plurality of menu items in the second display format for a predetermined period and thereafter, restoring the display format to the first display format.

It is another object of the present invention to prevent an apparatus from causing an operation error when a wrong menu item is selected and accepted.

In order to achieve the above object, according to the present invention, there is provided a man-machine interface apparatus which allows an operator to select an arbitrary menu item from a plurality of menu items that are simultaneously displayed, comprising:

menu selection means for allowing the operator to select an arbitrary menu item from the plurality of displayed menu items;

confirmation means for confirming selection of the arbitrary menu item by the operator; and inhibition means for inhibiting an operation of the menu selection means for a predetermined first period when the operation of the arbitrary menu item is confirmed.

According to this man-machine interface, another selection item is never erroneously accepted during the first period.

According to one preferred aspect of the present invention, each of the plurality of menu items is assigned with an eye switch function. When the present invention is applied to menu item selection based on the eye switch, the operability can be effectively improved.

According to one preferred aspect of the present invention, the menu selection means comprises:

line of sight position detection means for detecting a line of sight position of the operator on display means;

coincidence detection means for detecting a coincidence between the line of sight position of the operator detected by the line of sight position detection means and a display position of a menu item displayed on the display means; and processing execution means for executing processing corresponding to the menu item matching the line of sight position in accordance with an output from the coincidence detection means.

Another menu item can be prevented from being selected during processing of the previously selected menu item.

According to one preferred aspect of the present invention, the confirmation means confirms the selection by checking if a selection operation for one menu item by an eye switch continues for a predetermined second period.

According to one preferred aspect of the present invention, the apparatus displays the plurality of menu items as a list.

According to one preferred aspect of the present invention, the apparatus displays a list of a plurality of menu items or commands for attaining an internal setting operation of a main apparatus.

According to one preferred aspect-of the present invention, the main apparatus is a camera built-in type VTR.

According to one preferred aspect of the present invention, the apparatus further comprises means for variably adjusting the first period.

According to one preferred aspect of the present invention, the menu selection means comprises display control means for switching a display state on display means in correspondence with a selected menu item, and when the display control means switches the display state of the menu item, the inhibition means inhibits the operation of the menu selection means during the first period immediately after the switching operation.

According to one preferred aspect of the present invention, the inhibition means comprises means for informing the operator that the operation of the menu selection means is inhibited.

Other features and advantages of the present invention will be apparent from the following description taken in conjunction with the accompanying drawings, in which like reference characters designate the same or similar parts throughout the figures thereof.

DETAILED DESCRIPTION OF THE INVENTION

A menu search method using an eye switch according to an embodiment of the present invention will be described below.

<Eye Switch>

Figure 5:
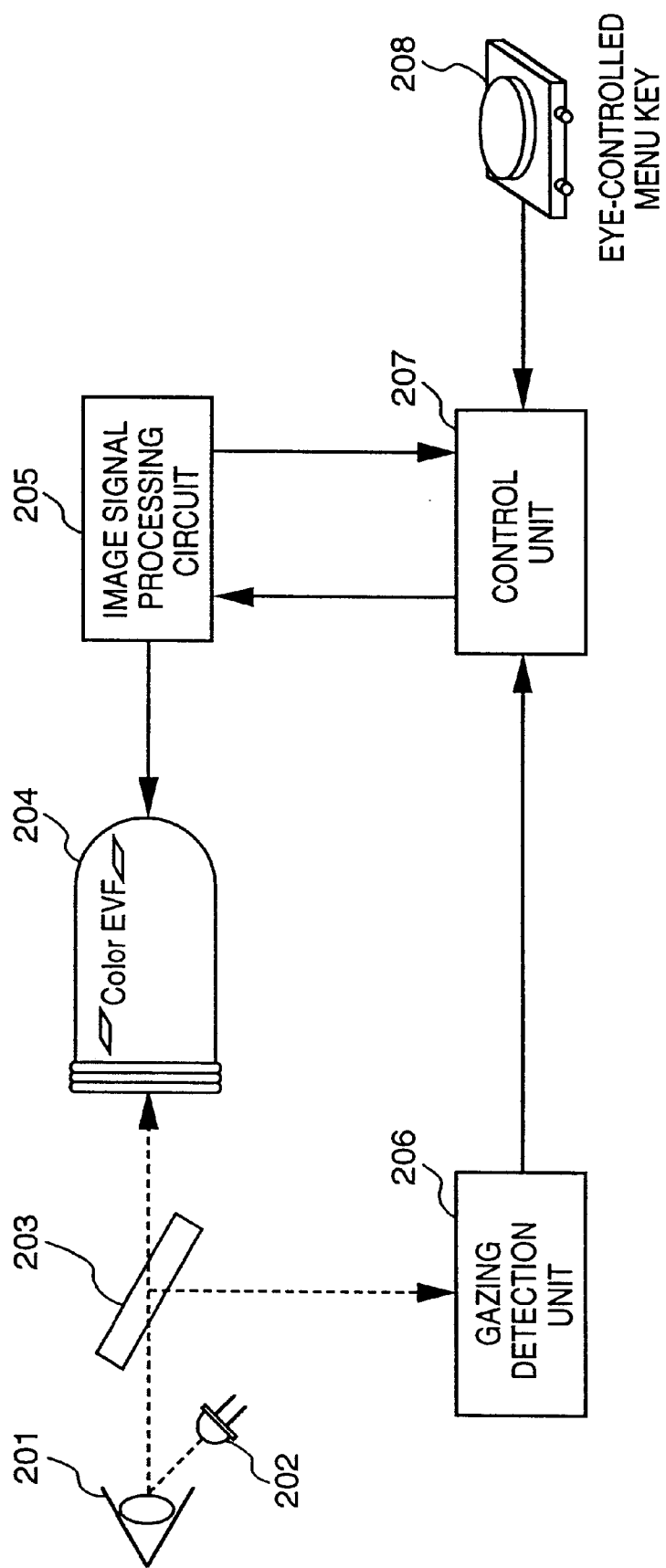
FIG. 5 is a block diagram showing the basic arrangement for practicing the present invention.

FIG. 5 is a block diagram showing the basic arrangement of an eye switch used in this embodiment.

Referring to FIG. 5, an operator inputs his or her line of sight from his or her eyeball 201 and observes the display screen of a display device 204. On the display screen of the display device 204, operation items processed by an image signal processing unit 205 are displayed.

On the other hand, infrared rays irradiated from an infrared LED 202 are reflected by the eyeball 201 of the operator, and are then reflected by a dichroic mirror 203. The reflected infrared rays are then input to a line of sight detection unit 206. The line of sight detection unit 206 detects the input line of sight position of the operator, and outputs the detection result to a control unit 207. The control unit 207 executes eye switch processing on the basis of the detection result of the input line of sight position. More specifically, the control unit 207 compares the input line of sight position of the operator with the display position of one operation item displayed on the display device 204. As a result of comparison, if the two positions match, the control unit 207 executes an operation of a VTR corresponding to the selected operation item or switches the display state.

A plurality of embodiments of the present invention to be described hereinafter commonly have the eye switch mechanism shown in FIG. 5. In order words, the display control in the plurality of embodiments is realized by a program of the control unit 207.

<First Embodiment>

Figure 1:
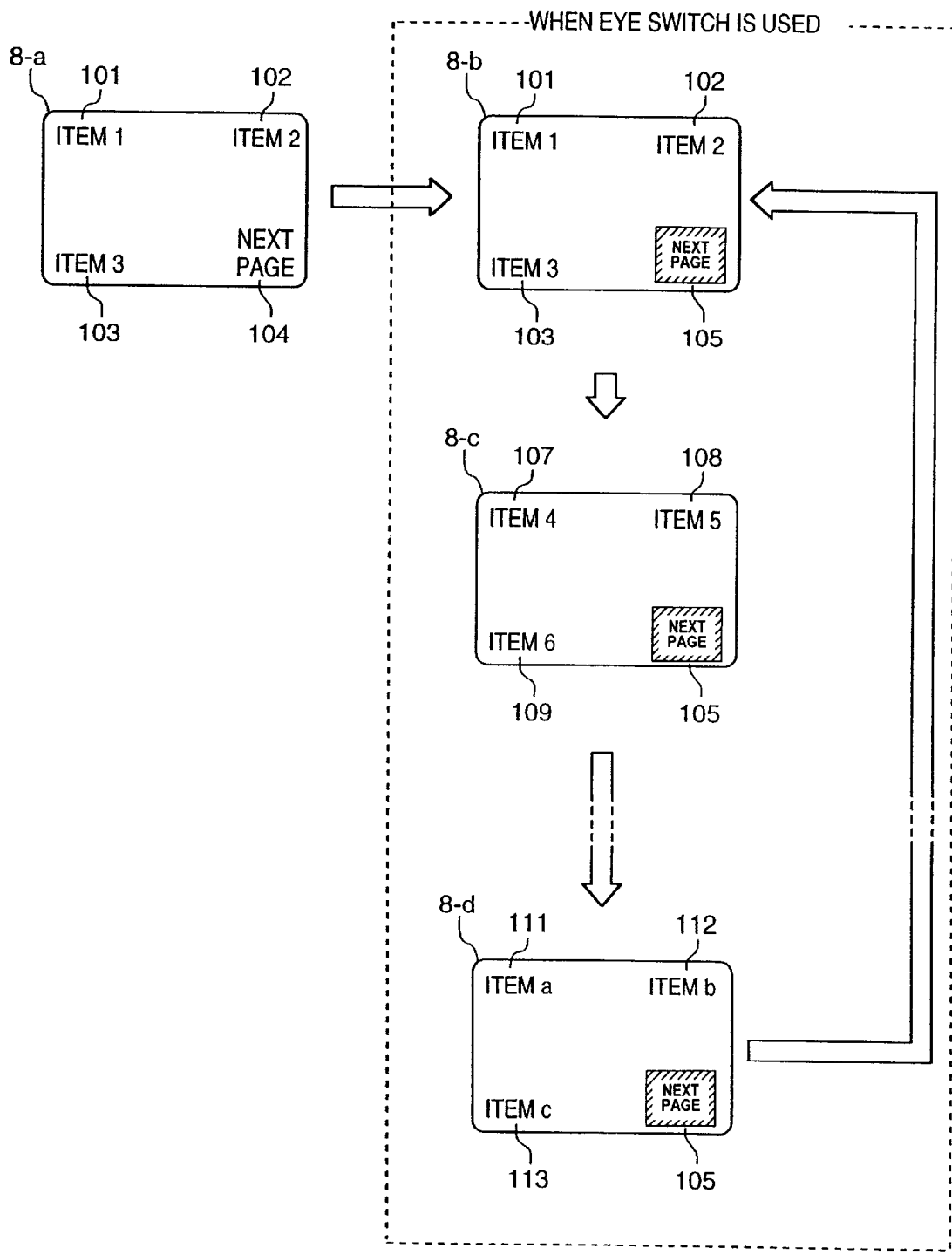
FIG. 1 is an explanatory view of the menu display state on a display unit based on a conventional method.
Figure 2:
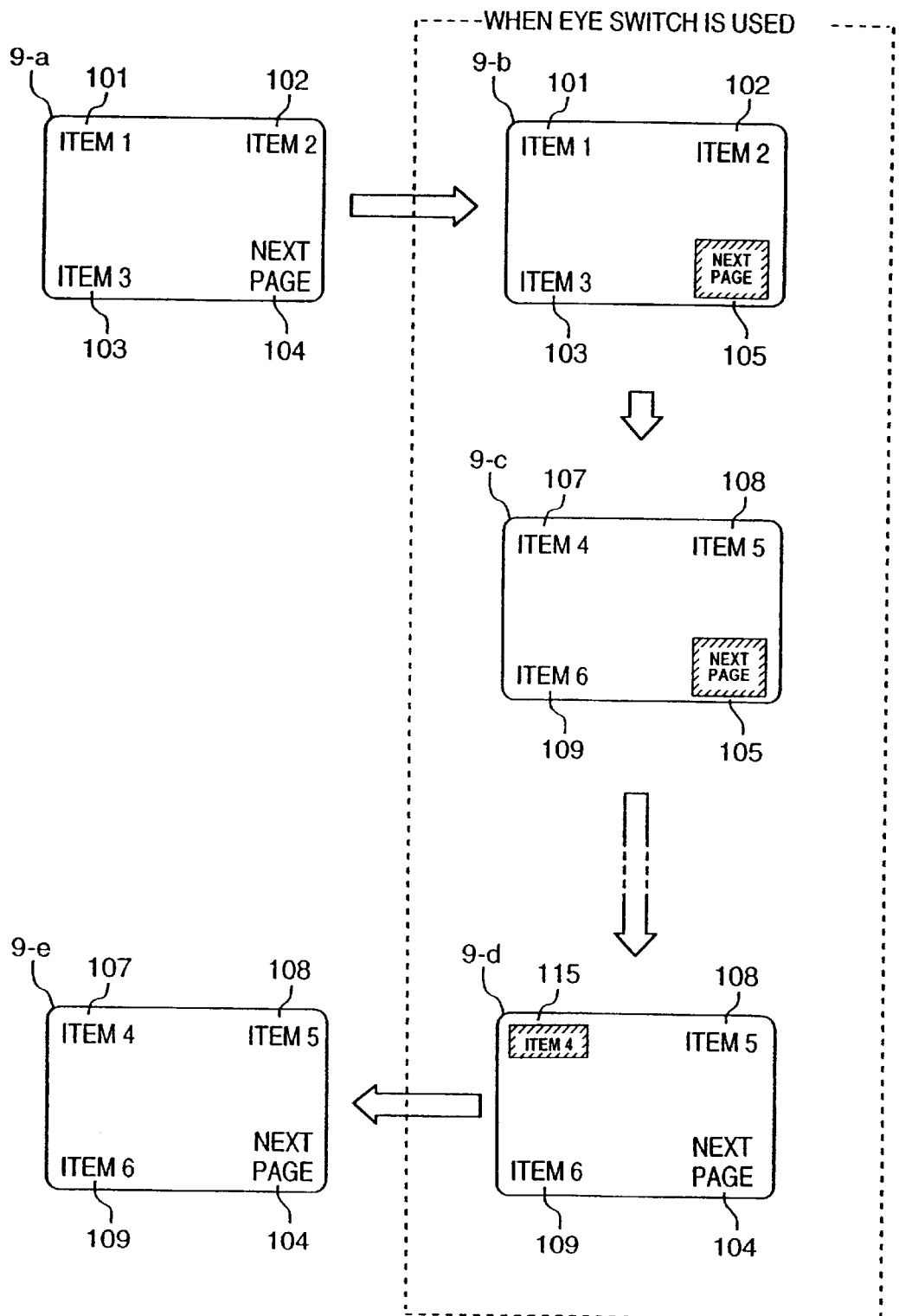
FIG. 2 is an explanatory view of the menu display state of the conventional method shown in FIG. 1.

In the first embodiment according to the present invention, the operation sequence of the control unit 207 shown in the block diagram of FIG. 5 described above is as shown in the flow chart shown in FIG. 6. FIG. 7 shows the transition states of page screens generated by the display device 204 under the eye switch control realized by the first embodiment. The eye switch according to the first embodiment will be described in detail below with reference to FIGS. 5 to 7. In FIG. 7, reference numerals 101 to 113 denote the same parts as in FIG. 2.

Figure 6:
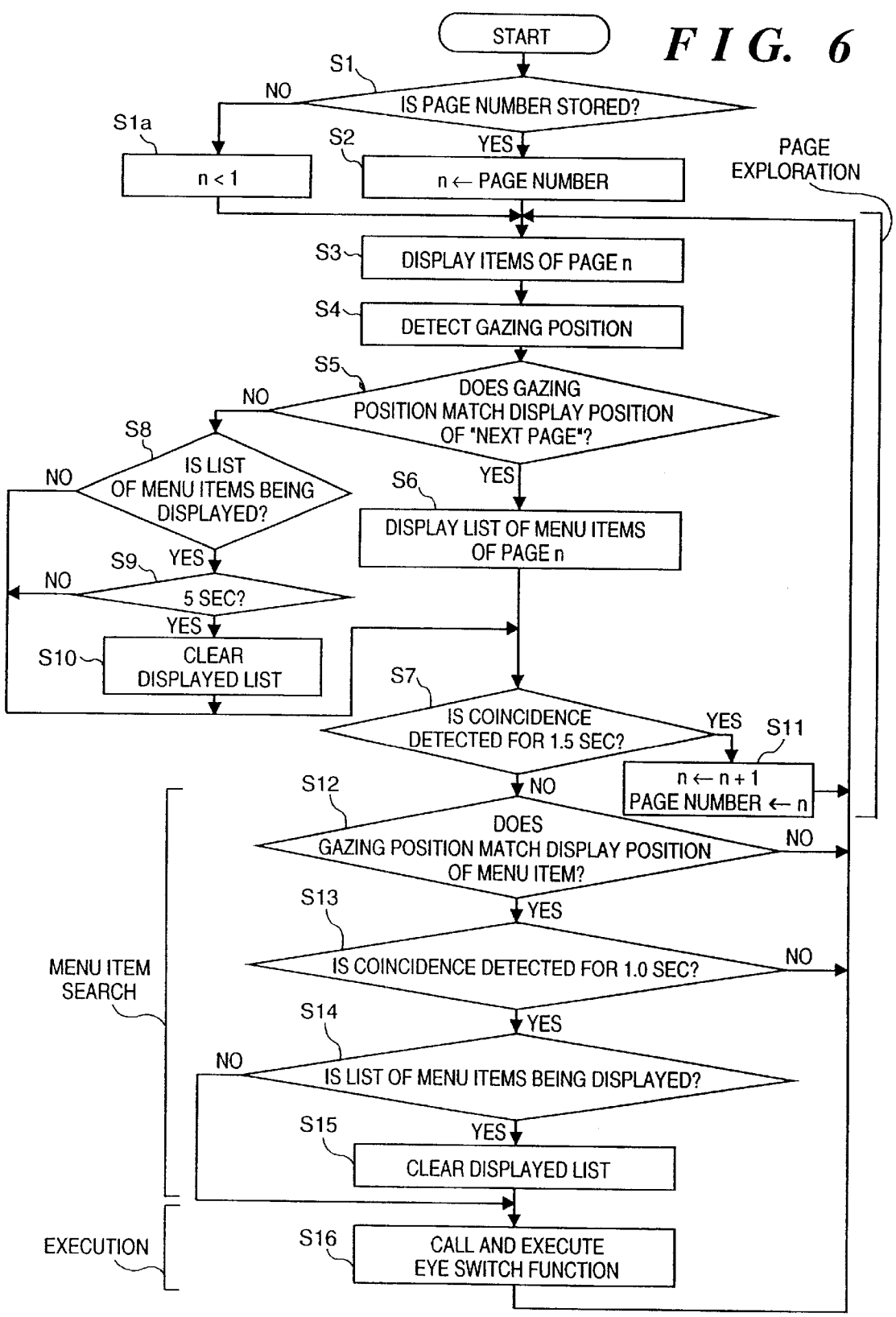
FIG. 6 is a flow chart showing the operation sequence of a control unit according to the first embodiment of the present invention.
Figure 7:
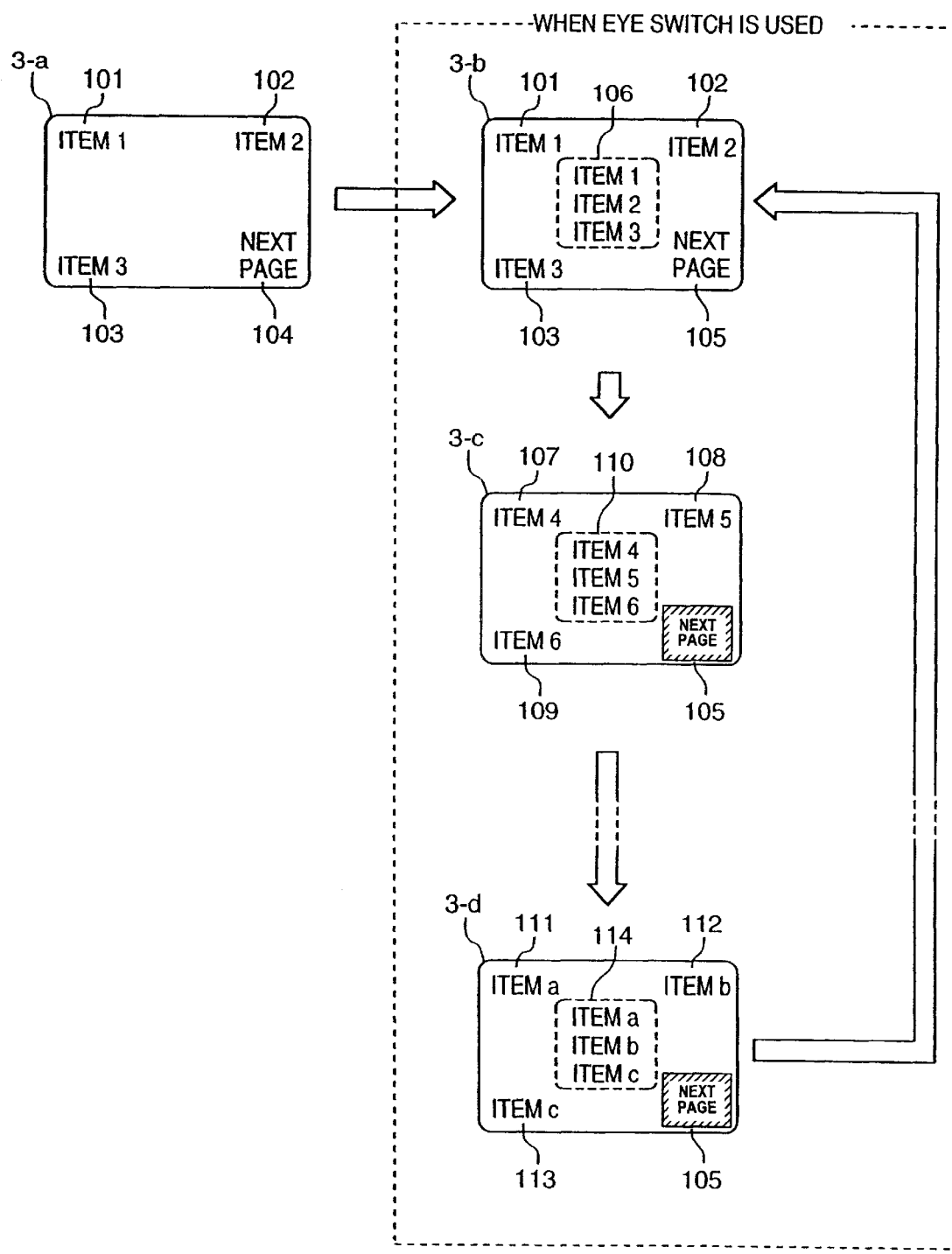
FIG. 7 is an explanatory view of the menu display state on a display unit of the first embodiment.

In steps S1 to S3 in FIG. 6, it is checked if the page number, n, of a menu page screen in the previous operation of the eye switch is stored. The reason why the page number in the previous operation is stored is that a page screen having the same page number as that in the previous operation is initially displayed in the current operation. If the page number is stored (YES in step S1), the page number is stored in a register n (step S2); otherwise, n=1 is set (step S1a). In step S3, an item list of the page number stored in the register n is displayed. In step S4, the line of sight position of the operator is detected.

In steps S5 to S7, it is checked if the line of sight position matches a "NEXT PAGE" display field 104. In steps S12 to S13, it is checked if the line of sight position matches one of the display positions of menu items.

A case will be examined below wherein when the items of the stored page number n are displayed as a list (step S3), no desired menu item is displayed on a page screen 3-a (see FIG. 7). In this case, in order to explore a page having a target menu item, the operator gazes at the "NEXT PAGE" item display field 104. This line of sight position is detected in step S4.

If it is detected in step S5 based on the line of sight position detected in step S4 that the operator gazes at the "NEXT PAGE" display field 104, the display field 104 is emphasis-displayed on the page screen 3-b, and the operator can confirm that an eye switch associated with the next page selection function is being executed. At the same time, a list of menu items of page n is displayed on a central field 106 on the display device 204 in step S6. The operator can confirm menu items, which can be operated by eye switches, on the basis of the list displayed on the field 106.

Subsequently, the operator moves his or her line of sight position from the "NEXT PAGE" display field 104 upon a change in display state on the display screen. The control advances to step S7→step S12→step S3→step S4→step S5. Since the line of light position does not match the display field 104, the control advances from step S5 to step S8. Steps S8 to S10 perform control for keeping the list of menu items displayed on the field 106 for 5 sec unless the line of sight position matches one of the display positions of the menu items (NO in step S12), after the line of sight position temporarily matches the position of the display field 104 (YES in step S5), and thereafter, falls outside the display field 104 (NO in step S5).

The list of menu items is displayed for 5 sec in step S9 via step S8 even after the line of sight position falls outside the "NEXT PAGE" display field 104 (NO in step S5) (see a page screen 3-d in FIG. 7). More specifically, if the line of sight position falls outside the "NEXT PAGE" display field 104 in step S5, and if the list of menu items of the n-th page screen is being displayed in step S8, the display state is continued up to 5 sec in step S9, and after an elapse of 5 sec, the displayed list is cleared (step S10).

On the other hand, when the operator gazes at the "NEXT PAGE" display field 104 for 1.5 sec or more, this fact is detected in step S7, and the control advances to step S11. In step S11, the contents of the register n are incremented by +1. That is, the next page selection operation is successively executed. At this time, the menu items to be displayed change from "ITEM1" to "ITEM3" on fields 101 to 103 to "ITEM4" to, e.g., "ITEM6" on fields 107 to 109. The reason why the "NEXT PAGE" function is executed using an eye switch under the condition of gazing for 1.5 sec is to avoid an operation error caused by a variation of the line of sight position. If the "NEXT PAGE" function is successively executed, the list display field 106 changes to a field 110 corresponding to the fields 107 to 109 (page screen 3-c). Furthermore, when the operator keeps gazing at the "NEXT PAGE" display field 104, the next page selection operation in step S11 is successively executed at 1.5-sec intervals in step S7, and the display unit repetitively displays the page screen 3-c and the page screen 3-d. That is, when the line of sight position matches the "NEXT PAGE" display field 104 for 1.5 sec, a list (field 106, 110, or 114) of operation items on the next page is displayed on the central portion of the screen, and these operation items are respectively displayed as eye switches on the corner portions of the screen. Note that the list (field 106, 110, or 114) on the central portion of the screen is merely displayed but does not serve as an eye switch. On the other hand, the items displayed on the four corners (fields 107, 108, 109, and the like) also serve as eye switches.

Figure 8:
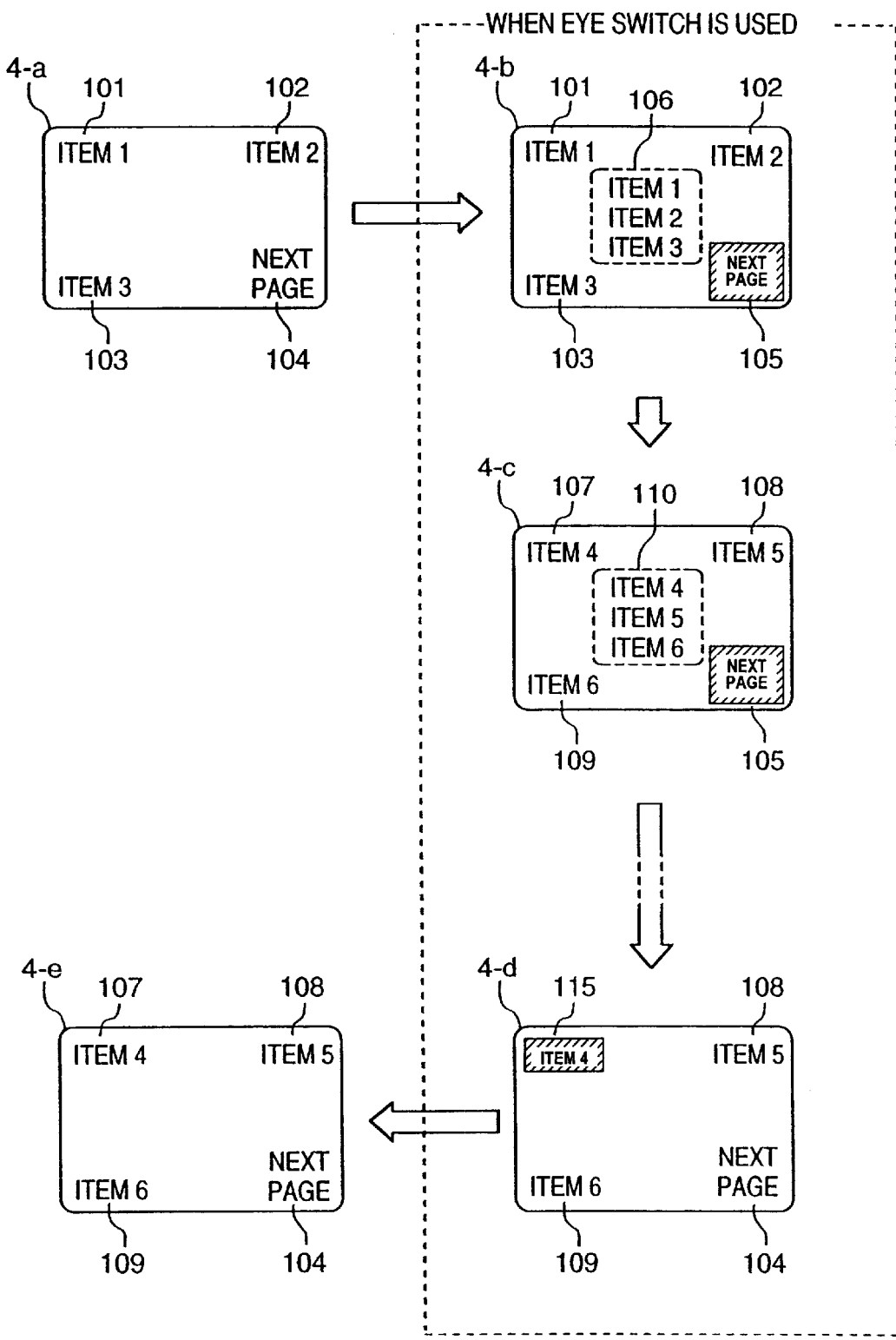
FIG. 8 is an explanatory view of the menu display state on the display unit of the first embodiment.

FIG. 8 shows the transition states of the page screens on the display device 204 when "ITEM4" is selected and executed by an eye switch.

When the operator moves his or her line of sight from the "NEXT PAGE" display field 104, the control advances to step S12 to check if the line of sight position matches one of the menu items (operation items) displayed on the four corner portions of the screen. If it is determined that the line of sight position matches one (e.g., "ITEM4") of the menu items (operation items), it is checked in step S13 if the operator gazes at the operation item for 1.0 sec or more. If YES in step S13, and if it is determined that the list of menu items is displayed (YES in step S14), the list display field 110 is cleared, and at the same time, the display field of the selected menu item (e.g., "ITEM4" is emphasis-displayed so as to inform the operator that the field (e.g., the field 107) of the item is being executed as an eye switch (see a page screen 4-d in FIG. 8).

The gazing period for 1.0 sec checked in step S13 is also assured to prevent an operation error. In this case, it is important that this gazing period is set to be different from the gazing period for 1.5 sec (step S7) upon execution of the "NEXT PAGE" eye switch (field 104). That is, a "long" gazing period is set for the next page selection operation so as to allow the operator to relatively slowly confirm the list displayed on each page upon execution of the next page selection operation. On the other hand, a "short" gazing period is set for selecting a menu item so as to allow the operator to quickly select a desired menu item after he or she has found a desired page. In other words, the two different time periods improve the operability.

Upon completion of the execution of the eye switch associated with the selected menu item, when the operator moves his or her line of sight position from the display field of the menu item, the display state on the display unit is restored to a normal image display state in step S15 (page screen 4-e).

According to a line of sight input device or display device of the first embodiment, the following effects are obtained.

I: Every time the next page selection operation is performed based on the line of sight input, since all the items available on the page are displayed on a field falling within the field of view of the operator, the operability can be improved.

II: A long window time is set for the operation of an eye switch associated with the next page selection operation which requires confirmation of many items, while a short window time is set for the operation of an eye switch used for selecting a target operation item, thus attaining high operability.

<Second Embodiment>

In the first embodiment, the names of menu items are displayed on the central portion of the display device (display unit) 204 during execution of the next page selection operation. In the second embodiment, the states of menu items or data associated with the respective items are displayed on the central portion of the display device 204 during execution of the next page selection operation.

Figure 9:
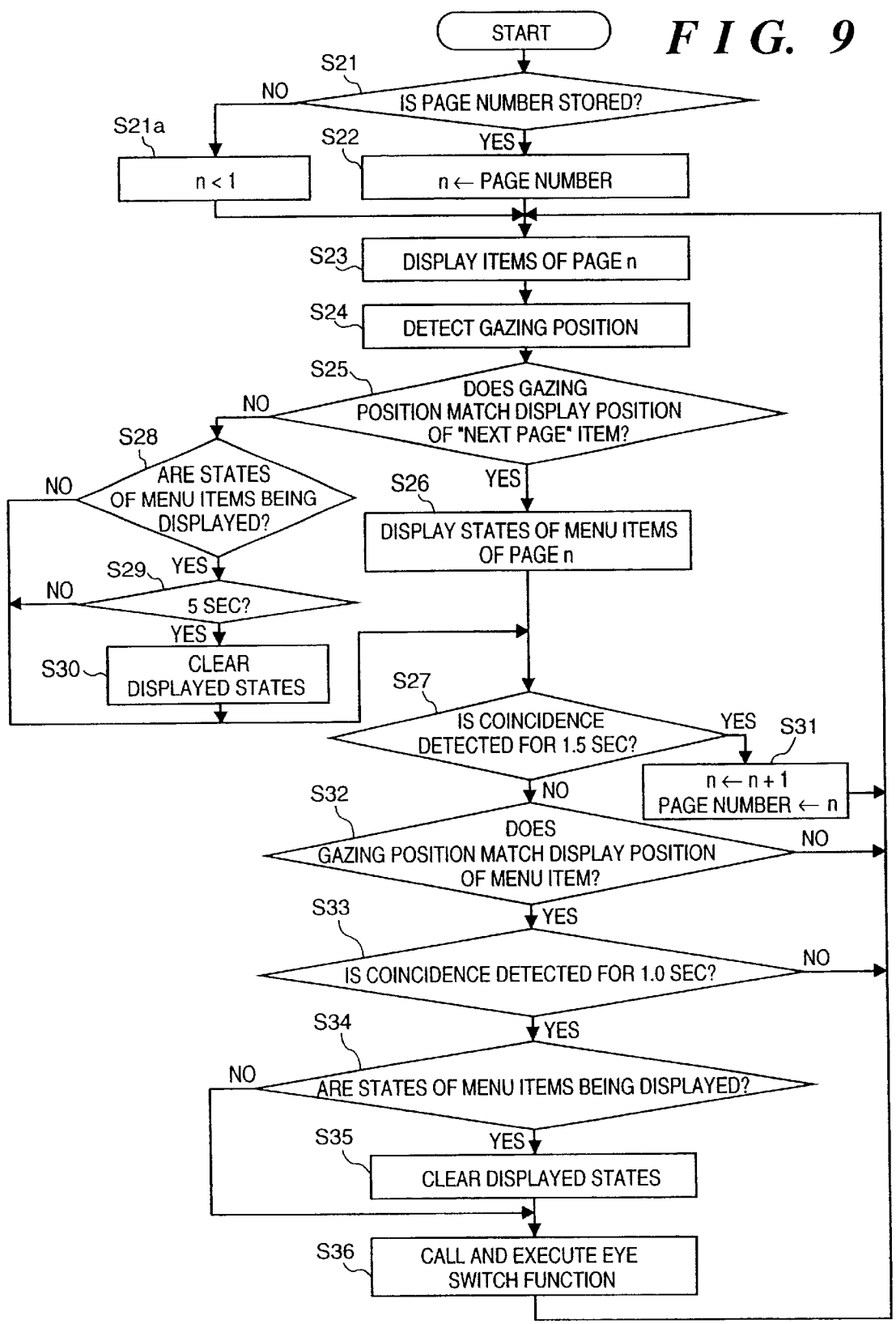
FIG. 9 is a flow chart showing the operation sequence of a microcomputer unit according to the second embodiment of the present invention.
Figure 10:
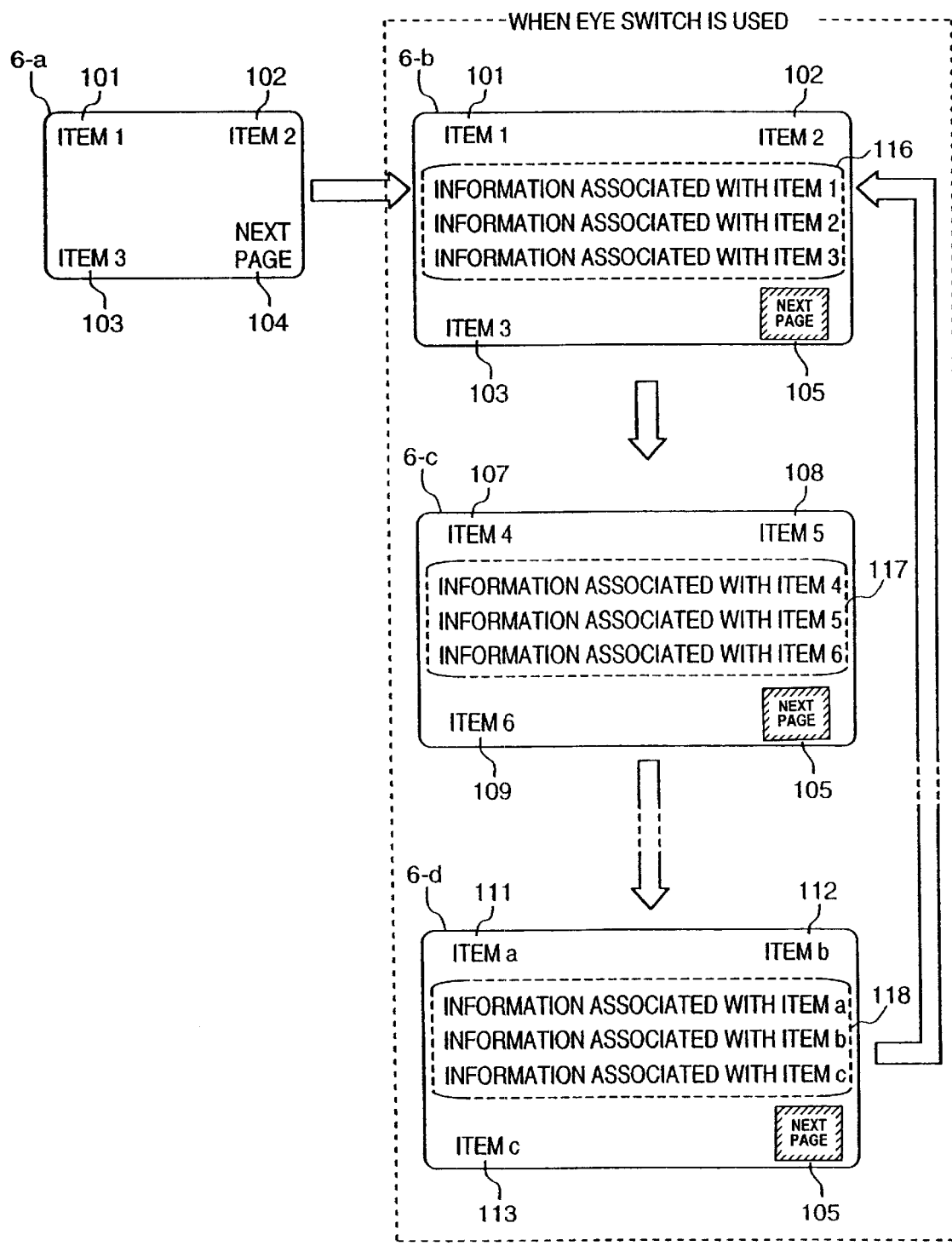
FIG. 10 is an explanatory view of the menu display state on a display unit of the second embodiment.

The second embodiment is also realized by the basic arrangement shown in the block diagram in FIG. 5 described above as in the first embodiment, and the operation sequence of the control unit 207 in the basic arrangement is as shown in the flow chart in FIG. 9. FIG. 10 shows the transition states of page screens on the image display device 204 of this embodiment. In FIG. 10, reference numerals 101 to 113 denote the same parts as in FIG. 7 of the first embodiment. An eye switch of the second embodiment will be described in detail below with reference to FIGS. 9 and 10.

In the control sequence of the second embodiment, in steps S21 to S23 in FIG. 9, it is detected in step S24 that an operator gazes at a "NEXT PAGE" display field 104, in the same manner as in steps S1 to S3 in FIG. 6 of the first embodiment.

If it is determined in step S25 that the operator gazes at the "NEXT PAGE" display field 104, the display state of the field 104 changes, as indicated by a field 105 on a page screen 6-b in FIG. 10, and the operator can recognize that an eye switch associated with the next page selection function is being executed. At the same time, in step S26, the states of menu items available on page n are displayed on a central field 116 on the display screen. Not only the names of menu items are displayed but also information associated with the current setting states of the respective items can be recognized by the operator. If it is determined in step S25 that the line of sight falls outside the "NEXT PAGE" display field 104, the list display field 116 is kept displayed for 5 sec in step S29 via step S28, in the same manner as in steps S8 to S10 in the first embodiment (see a page screen 6-b).

If it is determined in step S27 that the operator gazes at the field 104 for 1.5 sec or more, a register n is incremented by +1 in step S31, and the next page selection function is executed by an eye switch. In this manner, menu items to be displayed change from "ITEM1" to "ITEM3" on fields 101 to 103 to "ITEM4" to "ITEM6" on fields 107 to 109. At the same time, information displayed on the field 116 changes to that on a field 117 corresponding to the items on the fields 107 to 109 (see a page screen 6-c).

When the operator further keeps his or her eye on the "NEXT PAGE" display field 104, the next page selection operation in step S31 is repetitively executed at 1.5-sec intervals in step S27, and the display unit repetitively displays the page screen 6-b to a page screen 6-d.

When the operator wants to re-set the setting condition of selected "ITEM4" after he or she confirmed the condition, he or she can re-set the condition by performing a series of operations which are the same as those on the page screens 4-d and 4-e in the first embodiment. The subsequent processing in steps S32 to S36 is the same as that in steps S12 to S16 in FIG. 6 in the first embodiment, and a detailed description thereof will be omitted.

In addition to the effects of the first embodiment, according to the second embodiment described above, the following effect can be obtained.

III: The search operation of a menu selection item or confirmation of information associated with the selected item can be efficiently performed while assuring a sufficient field of view on the display unit.

In the first and second embodiments, menu items are merely displayed on the central field of the screen but may be assigned eye switch functions.

<Third Embodiment>

A line of sight input device according to the third embodiment will be described below with reference to the functional block diagram in FIG. 11.

Figure 11:
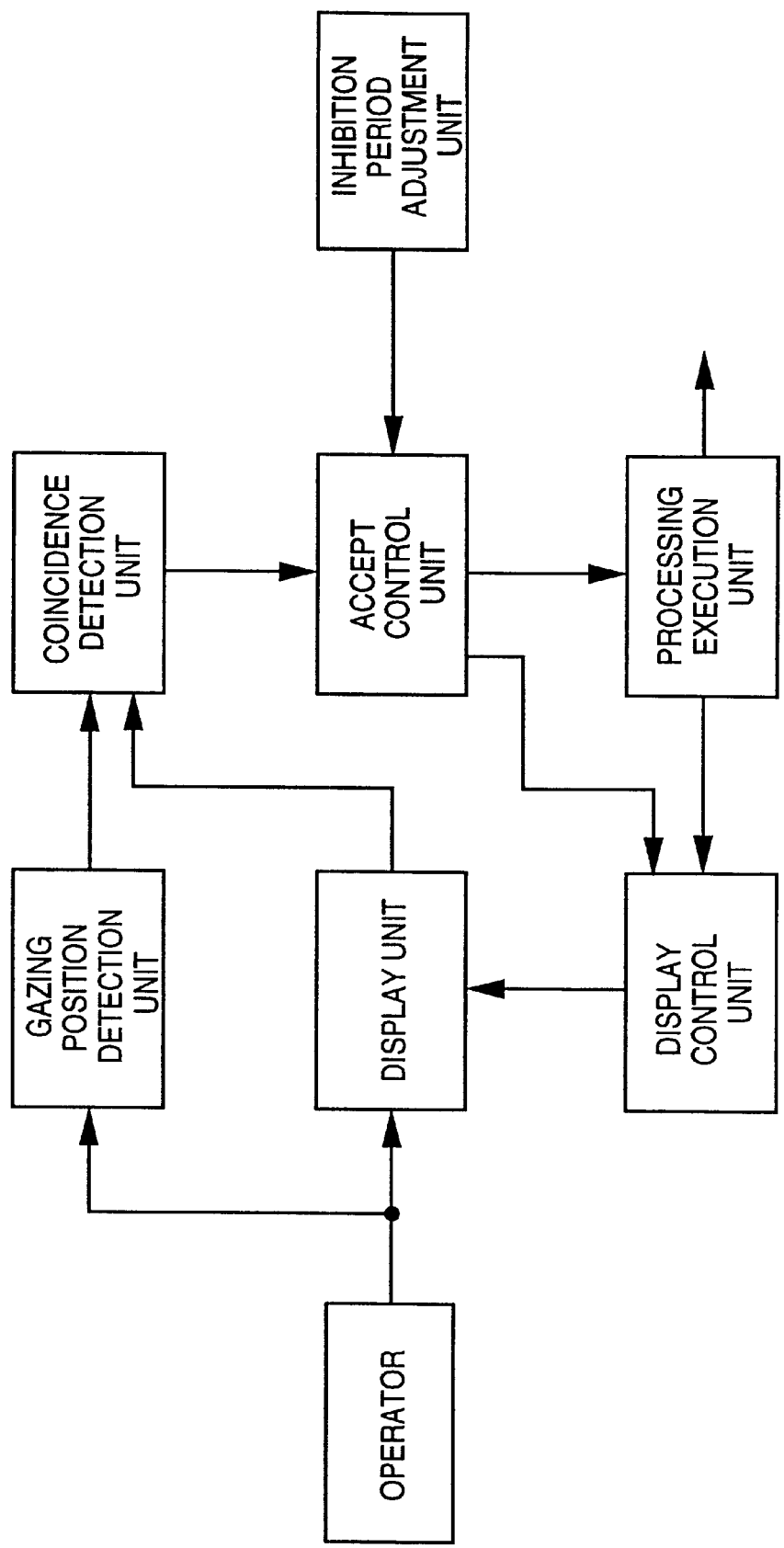
FIG. 11 is a block diagram showing the basic arrangement of a line of sight input device according to the third embodiment of the present invention.

As shown in FIG. 11, the line of sight input device of the third embodiment comprises a display unit, a line of sight position detection unit, a coincidence detection unit, a processing execution unit, an accept control unit, a display control unit, and an inhibition period adjustment unit.

The display unit is arranged for simultaneously displaying a plurality of selection items, operation items, or setting item·setting commands. An operator can enable a corresponding eye switch by gazing at a desired item displayed on the display screen of the display unit.

The line of sight position detection unit detects the line of sight position of the operator who is looking at one of the plurality of selection items, operation items, or setting item·setting commands displayed on the display screen of the display unit.

The coincidence detection unit detects a coincidence between the line of sight position and the display position of a selected item or command on the basis of the line of sight position information of the operator detected by the line of sight position detection unit and the display position information of the selection item, operation item, or setting item·setting command displayed on the display unit.

The processing execution unit executes processing corresponding to the selection item, operation item, or setting item·setting command matching the line of sight position in accordance with the output from the coincidence detection unit.

The accept control unit is arranged for inhibiting selection of a selection item by the line of sight input of the operator from being accepted during a predetermined period immediately after the page screen displayed on the display unit is switched by the processing executed by the processing execution unit.

The display control unit is arranged for switching at least two operation item groups each including a plurality of operation items, which are displayed on the display unit as a list.

The inhibition period adjustment unit is used by the operator to arbitrarily change the duration of the accept inhibition period of the accept control unit.

Since the line of sight input device of the third embodiment has the arrangement as shown in FIG. 11, when the page screen displayed on the display unit is switched, processing execution based on the line of sight input is inhibited from being accepted during a predetermined period immediately after the switching operation even when a coincidence between the line of sight position of the operator and the display position of the selection item, operation item, or setting item·setting command displayed on the display unit is detected. Therefore, a selection item can be inhibited from being accepted during the general processing operation based on the line of sight input, and an operation error of the device can be reliably prevented.

In the case of the line of sight input device of the third embodiment, since the operator can arbitrarily change the duration of the accept inhibition period of processing execution based on the line of sight input by operating the inhibition period adjustment unit, an optimal inhibition period can be set in correspondence with the operation speed of the operator, thus realizing an operation error prevention mechanism which is easier to operate.

Also, since the operator can recognize the accept inhibition period of processing execution based on the line of sight input, he or she can easily confirm the operation state. Therefore, a wasteful line of sight input operation can be prevented, thus greatly improving operability.

The fourth and fifth embodiments which present the concrete arrangement of the line of sight input device of the third embodiment will be described below with reference to the accompanying drawings.

<Fourth Embodiment>

Figure 12:
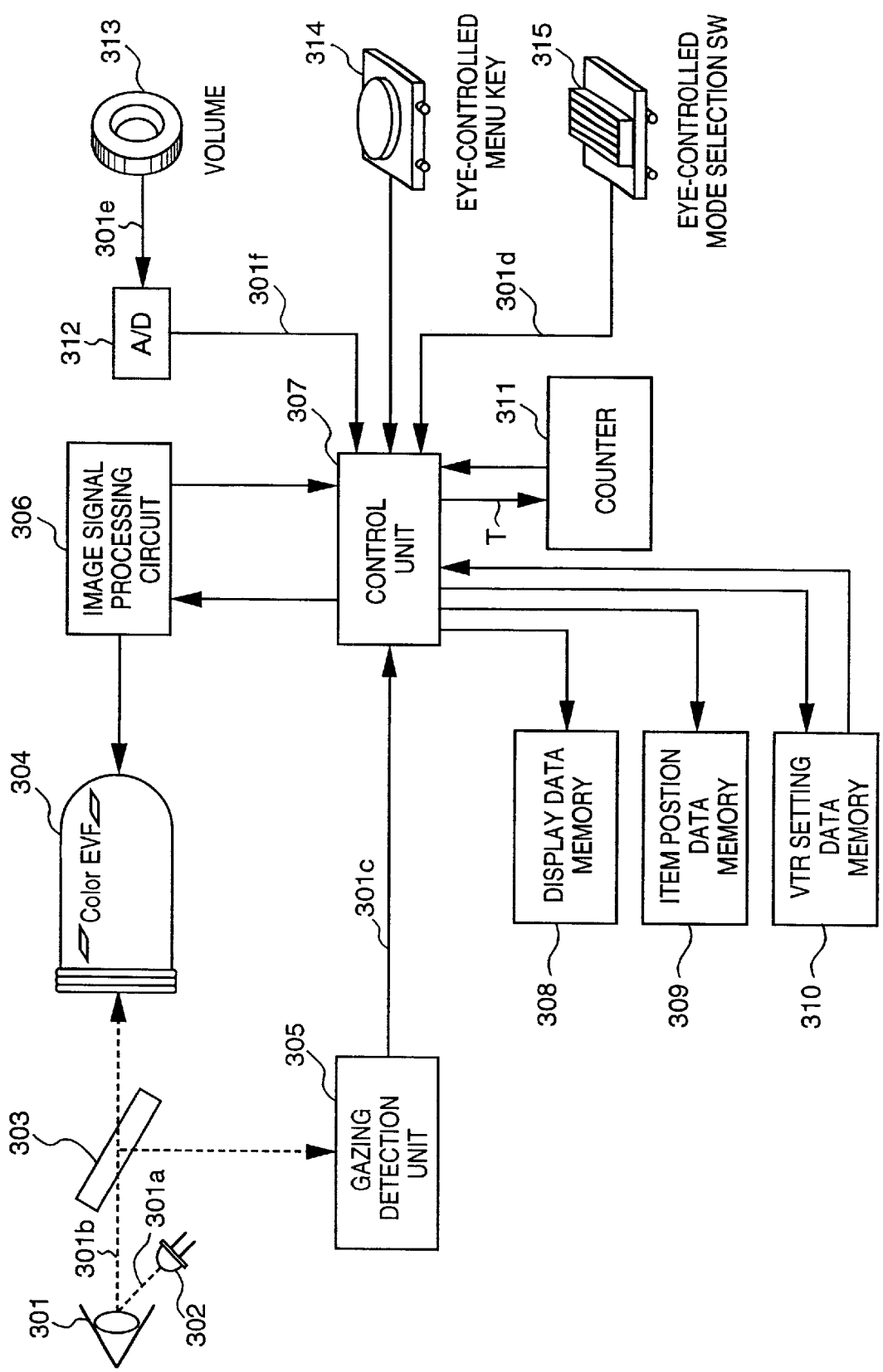
FIG. 12 is a block diagram showing the concrete arrangement of a line of sight input device according to the fourth embodiment of the present invention.

FIG. 12 is a block diagram which best illustrates the feature of the fourth embodiment. Referring to FIG. 12, reference numeral 301 denotes an eyeball of an operator who is gazing at a display unit 304; and 302, an infrared LED for irradiating infrared rays 301a onto the eyeball 301.

Reference numeral 303 denotes a dichroic mirror for guiding the infrared rays 301a reflected by the eyeball 301 toward a line of sight detection unit 305. The display unit 304 displays image information including information of selection items based on eye switches and an eye-controlled menu, and the like. Reference numeral 305 denotes a line of sight detection unit for detecting the line of sight position of the operator, and outputting the detection result as coordinate information.

Reference numeral 306 denotes an image processing unit for generating image information to be displayed on the display unit 304. Reference numeral 307 denotes a control unit for controlling the operation of the entire system. Reference numeral 308 denotes a memory for storing display data associated with the eye switches and eye-controlled menu. Reference numeral 309 denotes a memory for storing position data of selection items associated with the eye switches and the eye-controlled menu. Furthermore, reference numeral 310 denotes a VTR internal data setting memory for storing VTR internal data set via the eye-controlled menu.

Reference numeral 311 denotes a counter for measuring the accept inhibition time of the line of sight input; 312, an A/D converter; and 313, a volume which is used by the operator to change the accept inhibition time duration of the line of sight input. The volume 313 constitutes the inhibition period adjustment unit shown in FIG. 11. Reference numeral 314 denotes an eye-controlled menu key, which is used for enabling or disabling an eye-controlled menu mode. Reference numeral 315 denotes an eye-controlled mode selection switch.

A case will be exemplified below wherein the line of sight input device of the fourth embodiment with the above arrangement is applied to the eye switch of a camera built-in type VTR. As has already been described above, the eye switch is an input unit for selecting a display item indicating an operation of an electronic device such as a VTR on the basis of the line of sight position, and executing a corresponding operation, i.e., a device that realizes, by utilizing the line of sight input of the operator, a function obtained as if a mechanical switch arranged on a device main body were depressed.

The eye-controlled mode includes two modes, i.e., an eye-controlled AF (Auto focusing) mode and an eye switch mode, and one of these modes can be selected by the eye-controlled mode selection switch 315. The eye-controlled mode selection switch 315 generates an "H" or "L" logic signal 301d to the control unit 307, which controls the entire eye-controlled mode in accordance with the level of the logic signal.

The function of the eye switch starts from irradiating the infrared rays 301a from the infrared LED 302 onto the eyeball 301 of the operator who is looking at the display unit 304. The irradiated infrared rays 301a are reflected by the eyeball 301, and the reflected rays 301a are input to the line of sight detection unit 305 via the dichroic mirror 303.

The line of sight detection unit 305 detects the line of sight position of the operator, and outputs line of sight position coordinate information 301c indicating the detection result to the control unit 307.

Figure 3:
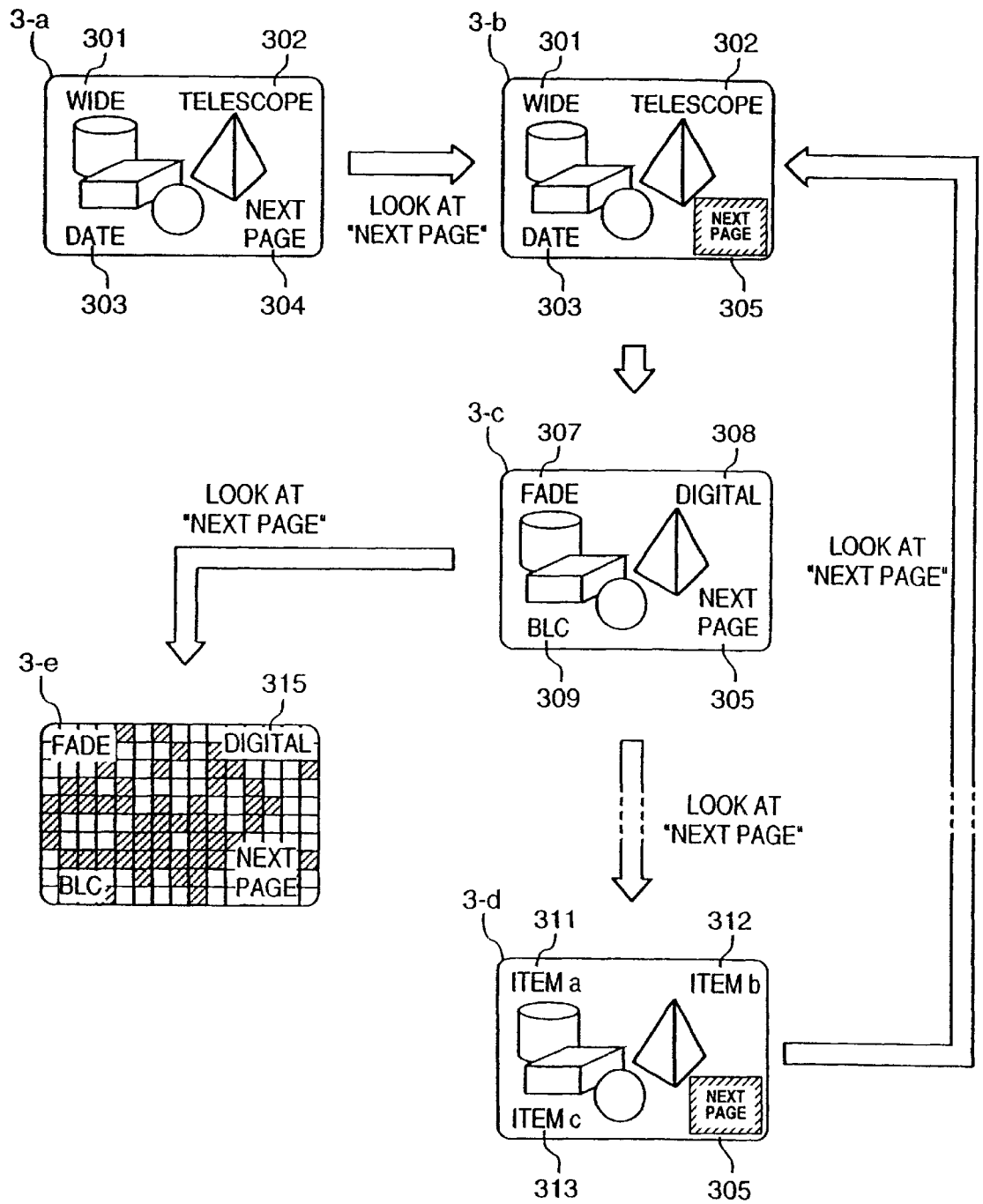
FIG. 3 is an explanatory view of the menu display state on a display unit based on another conventional method.

On the other hand, the display unit 304 displays image information from the image signal processing unit 306 on its display screen. The image information is obtained by superimposing operation items (designated character strings, icons, and the like) associated with eye switches on video information supplied from a camera or the like (not shown in FIG. 12) at positions designated by the control unit 307 (see a screen display example shown in FIG. 3). In this case, the operation item display data are stored in the display data memory 308.

The control unit 307 looks up and compares the line of sight position coordinate information 301c and the display position data of operation items stored in the display data memory 309 and associated with the currently displayed eye switches, thereby determining the operation item that the operator is gazing at.

When it is detected that the operator is gazing at a single operation item for a predetermined period (e.g., 1 sec), the control unit 307 executes the operation of a VTR function corresponding to the selected operation item.

As described above, when a large number of operation items of the eye switches are available, they are divided into several operation item groups to be displayed on several pages, and the operator selects a desired operation item by turning the pages. In the fourth embodiment, a "NEXT PAGE" display field for this purpose is always displayed on the lower right corner portion on the display screen of the display unit 304. When this item is selected by the line of sight input, the next page selection operation is executed.

The control unit 307 sets a predetermined value in the counter 311 and starts the counter 311 simultaneously with execution of the next page selection operation. The counter 311 measures the predetermined period for inhibiting the line of sight input from being accepted, and constitutes the accept control unit in FIG. 11. The counter 311 decrements its contents from the value set therein to 0.

The control unit 307 monitors the count operation of the counter 311, and controls to inhibit the input from the line of sight detection unit 305 from being accepted during a period in which the count value of the counter 311 is not 0. With this control, even when the operator inputs his or her line of sight, the VTR does not accept any line of sight input during the predetermined period.

At the same time, during the period in which the count value of the counter 311 is not 0, a command for highlighting display fields associated with the eye switches is input to the image signal processing unit 306, so that the operator can recognize the line of sight input accept inhibition period.

Furthermore, in order to allow the operator to arbitrarily set the duration of the line of sight input accept inhibition period, as described above, the line of sight input non-accept duration setting volume 313 is arranged. The volume 313 generates a DC potential signal 301e. Upon reception of the DC potential signal 301e, the A/D converter 312 converts the signal 301e into a digital numerical value signal 301f, and inputs the converted signal 301f to the control unit 307. The control unit 307 generates a setting value T corresponding to the input digital numerical value signal 301f, and sets the setting value T in the counter 311 for measuring the line of sight input accept inhibition period. With this operation processing, the operator can set the duration of the line of sight input accept inhibition period.

Note that, for example, a tact switch may be arranged in place of the volume 313. In this case, the operator can select whether or not the line of sight input accept inhibition period is assured immediately after the switching operation of page screens.

Figure 13:
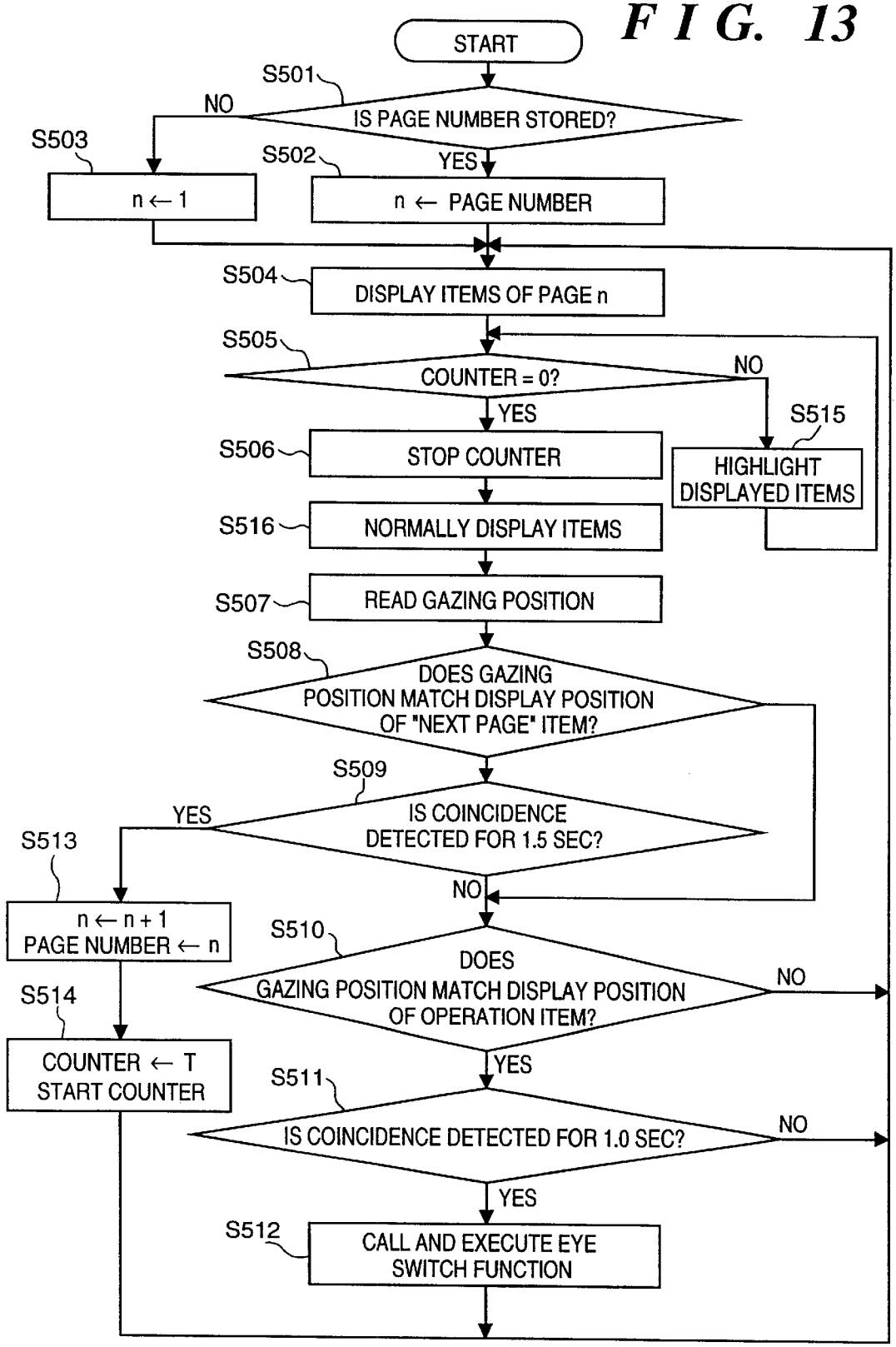
FIG. 13 is a flow chart showing the operation sequence of an eye switch of the fourth embodiment.

FIG. 13 is a flow chart showing in detail the above-mentioned processing sequence. The operation of the control unit 307 will be described in detail below with reference to this flow chart.

When the eye switch mode is selected by the eye-controlled mode selection switch 315, it is checked in the first step S501 if a display page number associated with the eye switches is stored.

If NO in step S501, the flow advances to step S503, and 1 is set as an initial value in a variable n. On the other hand, if YES in step S501, the flow advances to step S502, and the stored page number is substituted in the variable n.

Items corresponding to the set page number are displayed in step S504, and the line of sight position coordinate information 301c is read from the line of sight detection unit 305 in step S507. During this interval, a loop for checking the value of the counter 311 for measuring the line of sight input accept inhibition period in step S505, and preventing the processing from advancing to the next processing until the value becomes 0 is set. This loop includes processing step S515 of outputting a command for highlighting the displayed items to the image signal processing unit 306. With this control, the operator can recognize the line of sight input accept inhibition period.

If it is determined in step S505 that the count value of the counter 311 has become 0, the flow advances to step S506 to stop the operation of the counter 311. The flow then advances to step S516 to restore the normal display state of the displayed items. Thereafter, the flow advances to step S507 to start reading of the line of sight position coordinate information.

It is then checked in step S508 if the line of sight position read in step S507 matches the display position of the "NEXT PAGE" display field. If YES in step S508, the flow advances to step S509 to check if the coincidence is continuously detected for 1.5 sec.

If NO in step S509 or if NO in step S508, the control advances to the processing in step S510.

It is checked in step S510 if the detected line of sight position of the operator matches the display position of an operation item. If NO in step S510, the flow returns to step S504 to display the items on page n.

On the other hand, if YES in step S510, the flow advances to step S511 to check if the coincidence is continuously detected for 1 sec. If YES in step S511, the flow advances to step S512. In step S512, it is determined that the eye switch of the operation item is selected, and a function corresponding to the selected item is called. Thereafter, the flow returns to step S504 to display the items on page n. On the other hand, if NO in step S511, the flow returns to step S504 to display the items on page n, and the above-mentioned processing is repeated from the beginning.

When it is detected in step S509 that the line of sight position continuously matches the display position of the "NEXT PAGE" field for 1.5 sec, it is determined that the item associated with the next page selection function is selected, and the flow advances to step S513. In step S513, the variable n as the page selection number is updated. After the page number is set to be the updated value, the flow advances to step S514, and the above-mentioned setting value T is set in the counter 311 to start the counter. Thereafter, the flow returns to step S504 to repeat the above-mentioned processing from the beginning.

In this case, the display state is switched to that of a new operation item group in step S504, and the counter value is not 0. For this reason, in the processing step S505 of checking the counter value, the loop operation is performed, and the displayed items associated with the eye switches are highlighted. In addition, the processing in step S507 of reading the line of sight position is inhibited until the counter value becomes 0.

Since the line of sight input device of the fourth embodiment has the control sequence as shown in FIG. 13, when the page screen is switched, processing execution based on the line of sight input is inhibited from being accepted during a predetermined period (loop of steps S505 to S515) immediately after the switching operation even when a coincidence between the line of sight position of the operator and the display position of the selection item, operation item, or setting item-setting command is detected. Therefore, a wrong selection item can be inhibited from being accepted during the general processing operation based on the line of sight input, and an operation error of the device can be reliably prevented. That is, the accept control unit shown in FIG. 11 is realized by the loop of steps S505 to S515 in FIG. 13.

During the accept inhibition period of processing execution based on the line of sight input, since the displayed items are highlighted in step S515, the operator can be prevented from wastefully inputting a line of sight, thus greatly improving operability.

As described above, when the device with the arrangement shown in the block diagram in FIG. 12 is used, and the control unit 307 performs the processing sequence shown in FIG. 13, the fourth embodiment of the eye switch function can be realized actually.

<Fifth Embodiment>

The fifth embodiment of a line of sight input device according to the present invention will be explained below.

In the following description of the fifth embodiment, the present invention is applied to an eye-controlled menu of a camera built-in type VTR.

As described above, the eye-controlled menu is a function of selecting the internal state of the VTR on the basis of the line of sight input, e.g., selecting the time zone of a world clock, setting the ON/OFF state of a remote control sensor, and so on. The arrangement for realizing the eye-controlled menu function in the fifth embodiment is shown in the block diagram in FIG. 12 as in the fourth embodiment. Since the operations of the respective constituting elements are also the same as those in the operation contents described in the fourth embodiment, only a difference from the eye switch function will be described in detail below.

When the eye-controlled menu key 314 in the block diagram in FIG. 12 is depressed, the control unit 307 starts an eye-controlled menu operation. When the eye-controlled menu key 314 is depressed while the eye-controlled menu mode is enabled, the eye-controlled menu mode is disabled.

In the eye-controlled menu mode, the display unit 304 displays image information supplied from the image signal processing unit 306. The image information is obtained by superimposing operation items (designated character strings, icons, and the like) associated with eye switches on video information supplied from a camera or the like (not shown in FIG. 12) at positions designated by the control unit 307 (see a screen display example shown in FIG. 4). In this case, the operation item display data are stored in the display data memory 308.

The control unit 307 looks up and compares the line of sight position coordinate information 301c and the display position of a setting item·setting command associated with the currently displayed eye-controlled menu, thereby determining the setting item·setting command that the operator is gazing at.

When it is detected that the operator is gazing at a single item for a predetermined period (e.g., 1 sec), the control unit 307 executes processing corresponding to the selected setting item·setting command, thus performing the processing of the eye-controlled menu. The sequence of this processing will be described in the following description of the flow charts.

Figure 4:
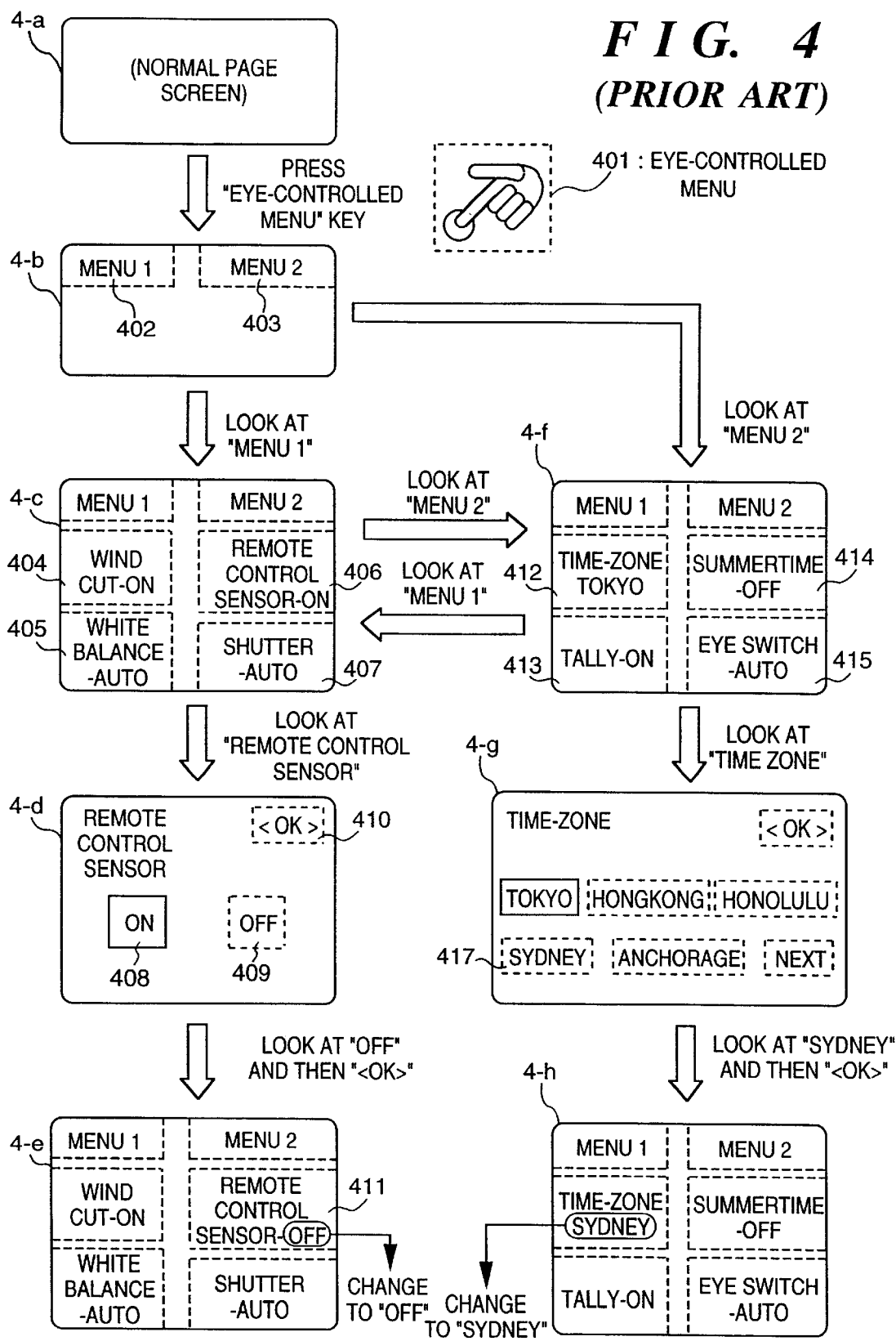
FIG. 4 is an explanatory view of the menu display state of the conventional method shown in FIG. 3.

As described above, the eye-controlled menu of the fifth embodiment advances its processing by switching page screens in accordance with the selected setting item·setting commands, as shown in FIG. 4. Referring to FIG. 4 again, upon depression of the eye-controlled menu key, an initial page screen of the eye-controlled menu (e.g., the page screen 4-b) is displayed.

Thereafter, for example, when the operator gazes at the "MENU1" display field, setting items assigned to "MENU1" are displayed like the third page screen 4-c. On the third page screen 4-c, the operator gazes at, e.g., the "REMOTE CONTROL SENSOR" field 406 to switch the page screen to the fourth page screen 4-d. Thereafter, the operator looks at the "OFF" display field 409 and then the "<OK>" display field 410, thereby setting the state of the VTR.

During this interval, the control unit 307 reads the line of sight position coordinate information 301c from the line of sight detection unit 305, and detects a coincidence between the line of sight position coordinate information 301c and the item display position. Then, the control unit 307 reads out data stored in the display data memory 308 in accordance with the setting item-setting command matching the line of sight position, and supplies the readout data to the image signal processing unit 306, thereby repetitively performing processing for switching the displayed page screens associated with the eye-controlled menu.

The control unit 307 performs processing for setting a predetermined value in the counter 311 and starting the counter simultaneously with the display switching processing. The counter 311 measures a predetermined period in which the line of sight input is inhibited from being accepted, and decrements its contents from the set value to 0. The control unit 307 monitors the count value of the counter 311, and does not read the output from the line of sight detection unit 305 during a period in which the count value is not 0 even when the line of sight detection unit 305 operates during this period. With this control, the VTR does not accept the line of sight input during the predetermined period.

At the same time, since a command for highlighting displayed items associated with the eye-controlled menu is output to the image signal processing unit 306 during the period in which the count value of the counter 311 is not 0, the operator can recognize the line of sight input accept inhibition period. Note that the duration of the line of sight input accept inhibition period can be arbitrarily set by the operator using the volume 313.

Figure 14:
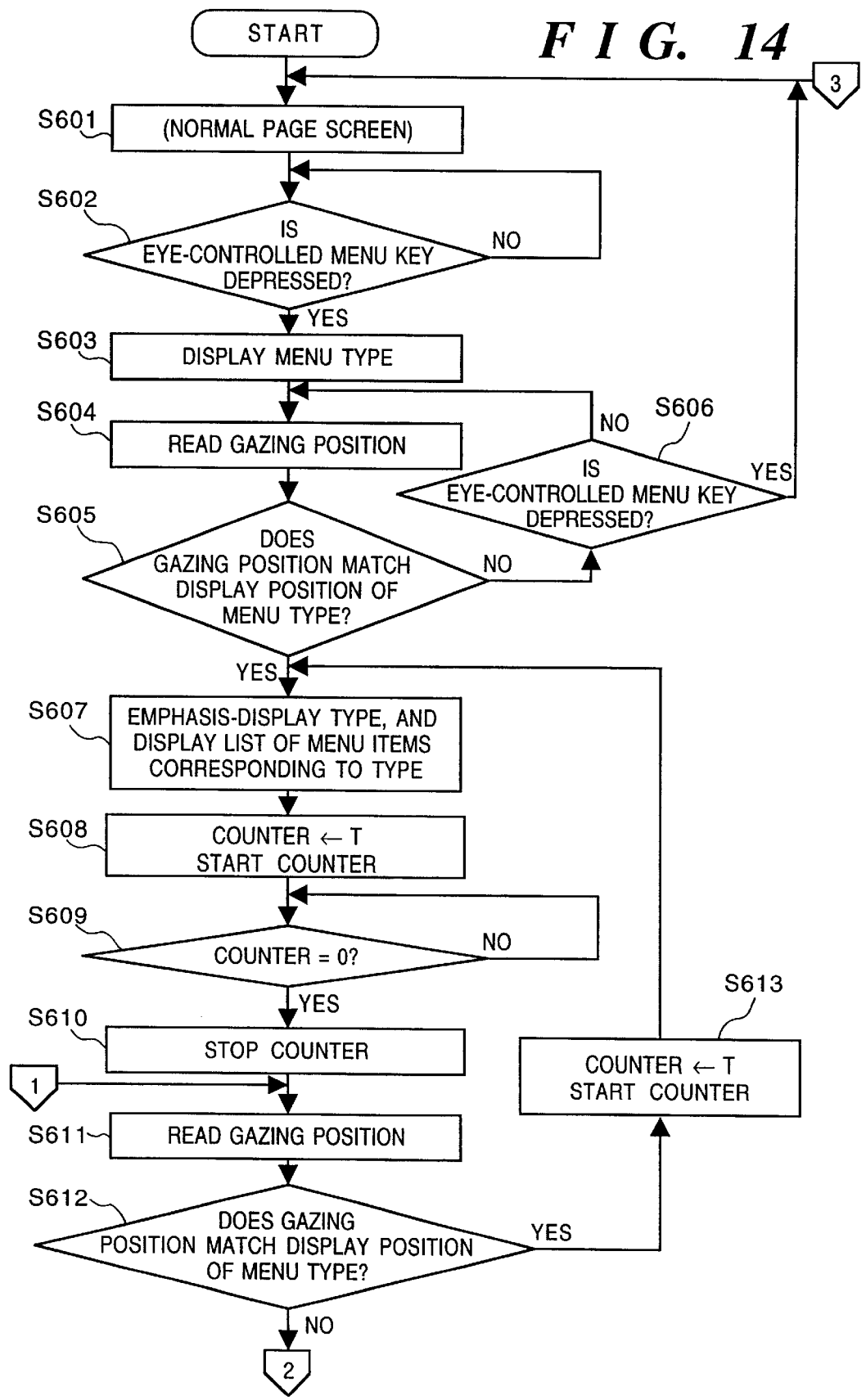
FIG. 14 is a flow chart showing the operation sequence of an eye-controlled menu according to the fifth embodiment of the present invention.
Figure 15:
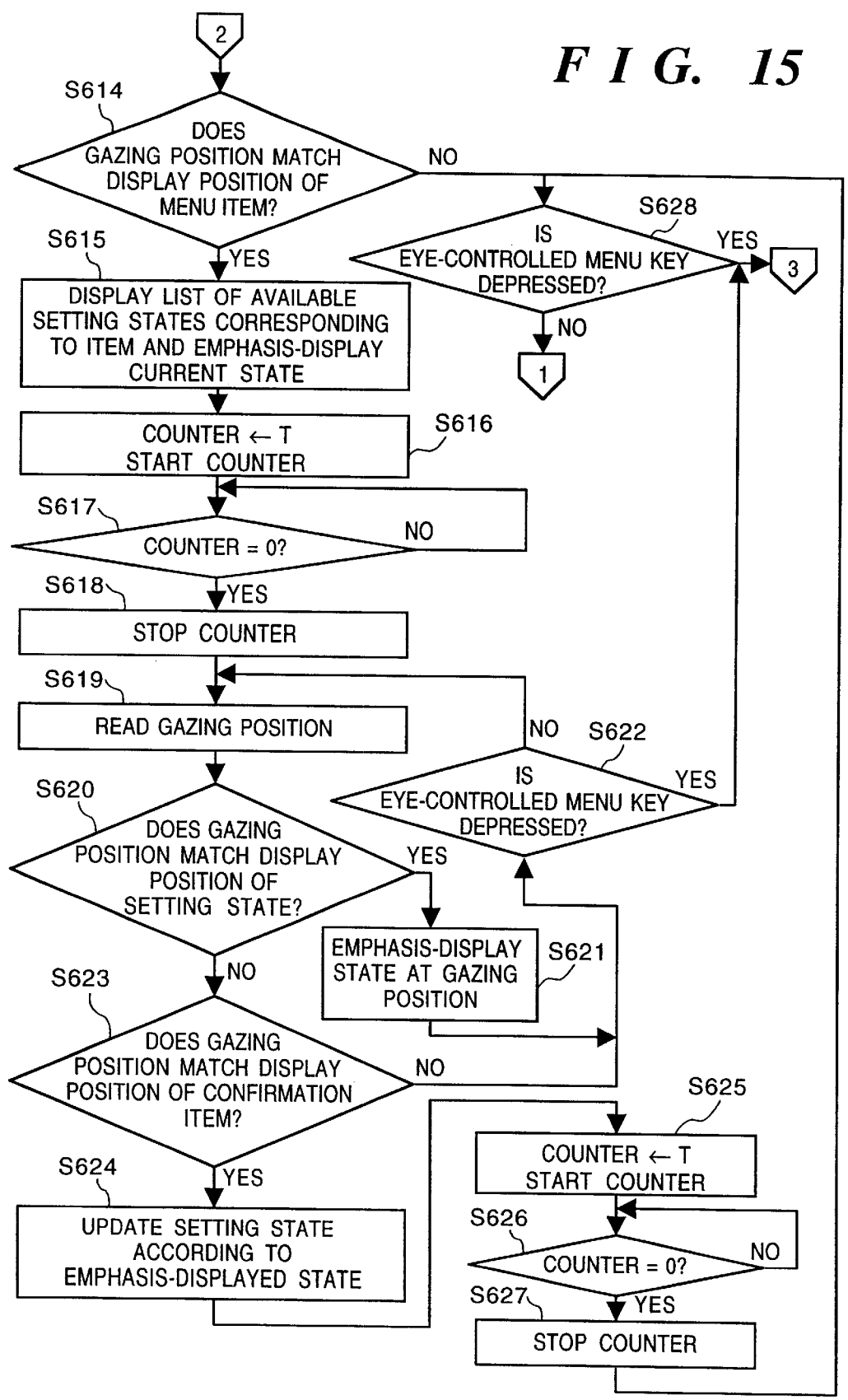
FIG. 15 is a flow chart showing the operation sequence of the eye-controlled menu of the fifth embodiment.

FIGS. 14 and 15 are flow charts showing in detail the above-mentioned processing sequence. The operation of the control unit 307 in the fifth embodiment will be described below with reference to these flow charts.

When the VTR is set in a normal mode, a normal page screen is displayed in step S601. In step S602, the control unit 307 checks if the eye-controlled menu key 314 is depressed. If Y (YES) in step S602, the flow advances to step S603, and the control unit 307 outputs a command for displaying menu types (MENU1, MENU2) to the image signal processing unit 306.

In step S604, the control unit 307 reads the line of sight position coordinate information 301c from the line of sight detection unit 305. In step S605, the control unit 307 compares the read information 301c and the display positions of the menu types to check if the line of sight position matches one of the display positions. As a result of comparison, if these positions do not match, the flow advances to step S606 to check if the eye-controlled menu key 314 is depressed.

If N (NO) in step S606, the flow returns to step S604 of reading the line of sight position. On the other hand, if Y in step S606, the flow returns to step S601.

On the other hand, if the coincidence between the two positions is detected in step S605, the flow advances to step S607 to emphasis-display the selected menu type, and to output a command for displaying a list of setting items assigned to the selected menu type to the image signal processing unit 306.

The flow advances to step S608, and the control unit 307 sets a predetermined setting value T in the counter 311 and starts the counter. In step S609, the control unit 307 monitors the count value of the counter 311. If it is determined in step S609 that the count value equals 0, the flow advances to step S610 to stop the count operation of the counter 311. Thereafter, in step S631, the control unit 307 reads the next line of sight position. In this state, the third page screen 4-c or the sixth page screen 4-f is displayed.

In step S612, the control unit 307 checks by comparison if the read line of sight position matches one of the display positions of the menu types. If Y in step S612, the flow advances to step S613 to set the counter 311, and thereafter, the processing is repeated from step S607.

On the other hand, if it is determined in step S612 that the line of sight position does not match any display position of the menu type, the flow advances to step S614 to check by comparison if the line of sight position matches one of the display positions of setting items. If N in step S614, the flow advances to step S628 to check if the eye-controlled menu key 314 is depressed. If Y in step S628, since it is determined that the eye-controlled menu has ended, the flow returns to step S601. On the other hand, if N in step S628, the flow returns to step S611 of reading the line of sight position to repeat the above-mentioned processing.

On the other hand, if the coincidence between the two positions is detected as a result of comparison in step S614, the flow advances to step S615 to display a list of available setting states corresponding to the setting item matching the line of sight position, and to emphasis-display the already selected state of the available states. The flow then advances to step S616 to set the counter 311 in the same manner as in step S608. In step S617, a loop for preventing the control from advancing to the next procedure until the count value equals 0 is formed.

If it is determined in step S617 that the count value equals 0, the controls exits the loop and advances to step S618 to stop the counter. The flow then advances to step S619 to read the line of sight position. At this time, the fourth page screen 4-d or the seventh page screen 4-g is displayed on the display screen.

It is checked by comparison in step S620 if the line of sight position read in step S619 matches the state display position of functions. As a result of comparison, if the two positions match, the flow advances to step S621, the state display field matching the line of sight position is emphasis-displayed. Thereafter, the flow advances to step S622 to check the state of the eye-controlled menu key 314. If Y in step S622, since the eye-controlled menu ends, the flow returns to step S601.

On the other hand, if N in step S622, the flow returns to step S619 to repeat the processing from the line of sight position reading processing.

As a result of comparison in step S620, if no coincidence is detected, the flow advances to step S623 to compare the read line of sight position and the display position of the setting state determination field (<OK> display field). If N in step S623, the flow returns to step S622 to execute the above-mentioned processing.

On the other hand, if Y in step S623, the flow advances to step S624, and data of the selected item of various item data stored in the VTR setting memory 310 is updated, thereby setting the state of the setting item in an emphasis-displayed state.

After an elapse of a wait time by a series of counter processing operations (steps S625, S626, and S627), the flow advances to step S628 to check the eye-controlled menu key. Thereafter, the above-mentioned processing is performed.

In the above description, the coincidence detection method between the line of sight position and the display position of an item is not particularly mentioned. Only when the detected line of sight position continuously matches the display position of an item for a predetermined period (e.g., 1 sec), the coincidence between these positions is detected.

As described above, upon reception of an input from an eye switch, the control unit 307 of the fifth embodiment does not accept data from the line of sight detection unit 305 in step S609, S617, or S626. With this control, the VTR inhibits the line of sight input from being accepted during the predetermined period.

As has been described in detail above, when the control unit 307 in the arrangement shown in the block diagram in FIG. 12 performs the processing sequence shown in FIGS. 14 and 15, the present invention in the eye-controlled menu can be effectively realized.

As many apparently widely different embodiments of the present invention can be made without departing from the spirit and scope thereof, it is to be understood that the invention is not limited to the specific embodiments thereof except as defined in the appended claims.

What is claimed is:

1. A man-machine interface apparatus which allows an operator to select an arbitrary menu item from a plurality of menu items that are displayed on a screen, comprising:

menu selection means for selecting the arbitrary menu item from the plurality of menu items on the basis of an instruction of the operator;

confirmation means for confirming a completion of the selection of the arbitrary menu item by said menu selection means; and inhibition means for inhibiting a selecting operation of said menu selection means for a predetermined time after a completion of a menu selecting operation of the arbitrary menu item by said menu selection means.

2. The apparatus according to claim 1, wherein each of the plurality of menu items is assigned with an eye switch function.

3. The apparatus according to claim 2, wherein said menu selection means comprises:

line of sight position detection means for detecting a line of sight position of the operator on display means;

coincidence detection means for detecting a coincidence between the line of sight position of the operator detected by said line of sight position detection means and at least one display position of a menu item displayed on said display means; and processing execution means for executing processing corresponding to the menu item matching the line of sight position in accordance with an output from said coincidence detection means.

4. The apparatus according to claim 2, wherein said confirmation means confirms the selection by checking if a selection operation for one menu item by an eye switch continues for a predetermined second period.

5. The apparatus according to claim 1, wherein said apparatus displays the plurality of menu items as a list.

6. The apparatus according to claim 1, wherein said apparatus displays a list of a plurality of menu items or commands for attaining an internal setting operation of a main apparatus.

7. The apparatus according to claim 1, wherein the main apparatus is a camera built-in type VTR.

8. The apparatus according to claim 1, further comprising means for variably adjusting the predetermined time.

9. The apparatus according to claim 1, wherein said menu selection means comprises display control means for switching a display state on display means in correspondence with a selected menu item, and when said display control means switches the display state of the menu item, said inhibition means inhibits the operation of said menu selection means during the predetermined time immediately after the switching operation.

10. The apparatus according to claim 1, wherein said inhibition means comprises means for informing the operator that the operation of said menu selection means is inhibited.

11. An electronic device having an interface which allows an operator to select an arbitrary menu item from a plurality of menu items, comprising:

display means for displaying on a monitor screen the plurality of the menu items;

menu selection means for selecting an arbitrary menu item from the plurality of displayed menu items on the basis of an instruction of the operator; and inhibition means for inhibiting a selecting operation of said menu selection means for a predetermined time after a menu selecting operation of the arbitrary menu item by said menu selection means is completed.

12. The apparatus according to claim 11, wherein each of the plurality of menu items is assigned with an eye switch function.

13. The apparatus according to claim 12, wherein said menu selection means comprises:

line of sight position detection means for detecting a line of sight position of the operator on said display means;

coincidence detection means for detecting a coincidence between the line of sight position of the operator detected by said line of sight position detection means and at least one display position of a menu item displayed on said monitor screen; and processing execution means for executing processing corresponding to the menu item matching the line of sight position in accordance with an output from said coincidence detection means.

14. The apparatus according to claim 12, further comprising:

confirmation means for confirming the selection by checking if a selection operation for one menu item by an eye switch continues for a predetermined second period different from the predetermined first time.

15. The apparatus according to claim 11, wherein said display means displays a list of a plurality of menu items or commands for attaining an internal setting operation of a main apparatus.

16. The apparatus according to claim 11, further comprising means for variably adjusting the predetermined first time.

17. The apparatus according to claim 11, wherein said menu selection means controls said display means to switch a display state on said monitor screen in correspondence with a selected menu item, and when said display means switches the display state of the menu item, said inhibition means inhibits the operation of said menu selection means during the predetermined time immediately after the switching operation.

18. A method of allowing an operator to select an arbitrary menu item from a plurality of menu items, comprising:

display step of displaying on a monitor screen the plurality of menu items;

menu selection step of selecting an arbitrary menu item from the plurality of displayed menu items on the basis of an instruction of the operator; and inhibition step of inhibiting a selecting operation of said menu selection step for a predetermined time after a menu selecting operation of the arbitrary menu item by said menu selection step is completed.

19. The method according to claim 18, wherein each of the plurality of menu items is assigned with an eye switch function.

20. The method according to claim 19, wherein said menu selection step comprises:

line of sight position detection step of detecting a line of sight position of the operator;

coincidence detection step of detecting a coincidence between the line of sight position of the operator detected in said line of sight position detection step and at least one display position of a menu item displayed on said monitor screen; and processing execution step of executing processing corresponding to the menu item matching the line of sight position in accordance with an output from said coincidence detection step.

21. The method according to claim 19, further comprising:

confirmation step of confirming the selection by checking if a selection operation for one menu item by an eye switch continues for a predetermined second period different from the predetermined time.

22. The method according to claim 18, wherein said display step displays a list of a plurality of menu items or commands for attaining an internal setting operation of a main apparatus.

23. The method according to claim 18, further comprising an adjusting step of variably adjusting the predetermined time.

24. The method according to claim 18, wherein said menu selection step controls said display step to switch a display state on said monitor screen in correspondence with a selected menu item, and when said display step switches the display state of the menu item, said inhibition step inhibits the operation of said menu selection step during the predetermined time immediately after the switching operation.

25. The method according to claim 18, wherein said inhibition step comprises an informing step of informing the operator that the operation of said menu selection step is inhibited.

* * * * *